United States Patent
Kim

(10) Patent No.: US 7,131,579 B2
(45) Date of Patent: Nov. 7, 2006

(54) AUTOMATIC JOURNALIZING METHOD AND SYSTEM

(75) Inventor: Suk Min Kim, Seoul (KR)

(73) Assignee: Goodmansoft Co., Ltd., Seoul (KR)

( * ) Notice: Subject to any disclaimer, the term of this patent is extended or adjusted under 35 U.S.C. 154(b) by 0 days.

(21) Appl. No.: 11/014,708

(22) Filed: Dec. 20, 2004

(65) Prior Publication Data

US 2005/0098623 A1    May 12, 2005

Related U.S. Application Data

(63) Continuation-in-part of application No. PCT/KR03/01192, filed on Jun. 18, 2003.

(30) Foreign Application Priority Data

Jun. 19, 2002  (KR) ............... 10-2002-0034317
Mar. 6, 2003   (KR) ............... 10-2003-0014026

(51) Int. Cl.
*G06F 17/60* (2006.01)
(52) U.S. Cl. ............... 235/379; 705/24
(58) Field of Classification Search ............ 235/379, 235/380, 382, 487; 705/30, 28, 24
See application file for complete search history.

(56) References Cited

U.S. PATENT DOCUMENTS

| | | | |
|---|---|---|---|
| 5,189,608 A | 2/1993 | Lyons et al. | 364/408 |
| 5,193,055 A | 3/1993 | Brown et al. | 364/406 |
| 6,000,832 A * | 12/1999 | Franklin et al. | 700/232 |
| 6,058,375 A * | 5/2000 | Park | 705/30 |
| 6,085,173 A | 7/2000 | Suh | 705/30 |
| 6,128,602 A | 10/2000 | Northington et al. | 705/35 |
| 6,275,813 B1 | 8/2001 | Berka | 705/30 |
| 6,289,317 B1 | 9/2001 | Peterson | 705/7 |
| 6,417,871 B1 * | 7/2002 | Nomura et al. | 715/775 |
| 2003/0050876 A1 * | 3/2003 | Tawara et al. | 705/30 |
| 2003/0101112 A1 * | 5/2003 | Gallagher et al. | 705/31 |
| 2005/0256789 A1 * | 11/2005 | Matsuoka | 705/30 |

FOREIGN PATENT DOCUMENTS

| | | |
|---|---|---|
| EP | 0837410 | 2/2001 |
| JP | 2000-215263 | 8/2000 |
| JP | 2001-167221 | 6/2001 |
| KR | 2002-0003666 | 1/2002 |
| WO | 2000/010097 | 2/2000 |
| WO | 2001/028188 | 4/2001 |
| WO | 2001-028188 | 4/2001 |

* cited by examiner

*Primary Examiner*—Thien M. Le
*Assistant Examiner*—Edwyn Labaze
(74) *Attorney, Agent, or Firm*—Bacon & Thomas, PLLC

(57) ABSTRACT

An automatic journalizing method and system enable even a novice in accounting to conduct automatic journalizing of transaction data by employing a reverse-journalizing technique. Further, the automatic journalizing method and system are capable of conducting exact journalizing by using preset binary transaction classification criteria. Further, by integrating multi-aspects of transaction classification including fundamental characteristics of transaction, original characteristics of journalizing and simplicity/complicacy characteristics of transaction, the automatic journalizing method and system allow even the novice to correctly perform automatic journalizing for both a simple and a complex transaction.

15 Claims, 21 Drawing Sheets

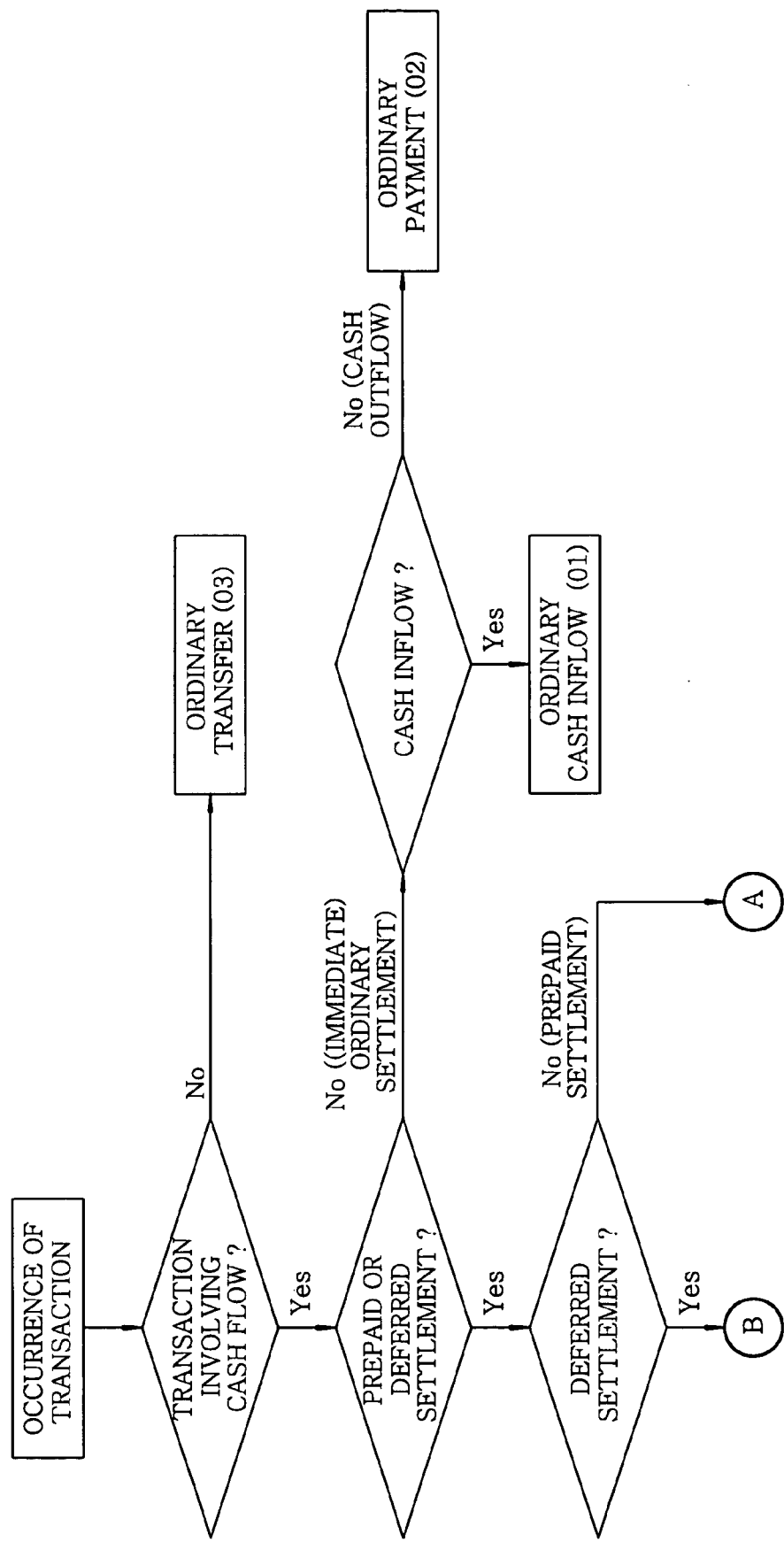

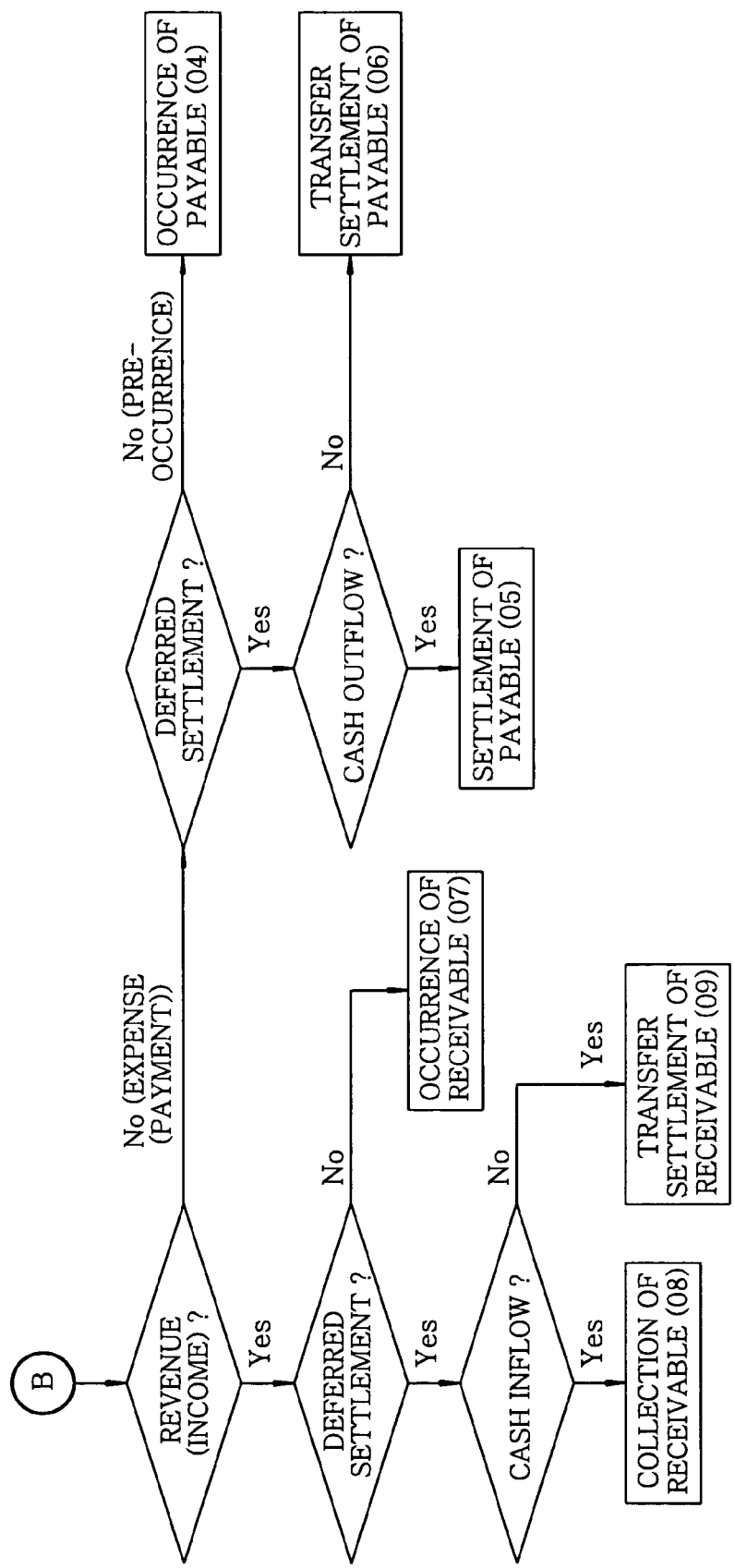

FIG.8
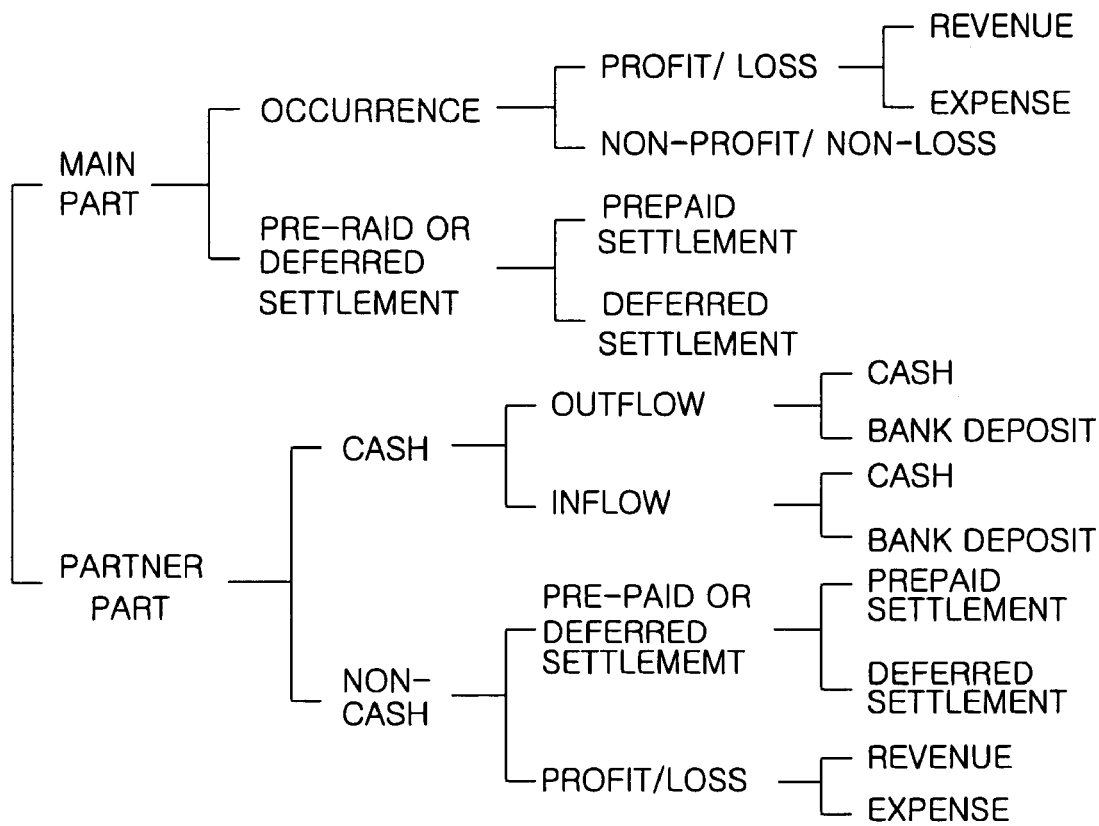
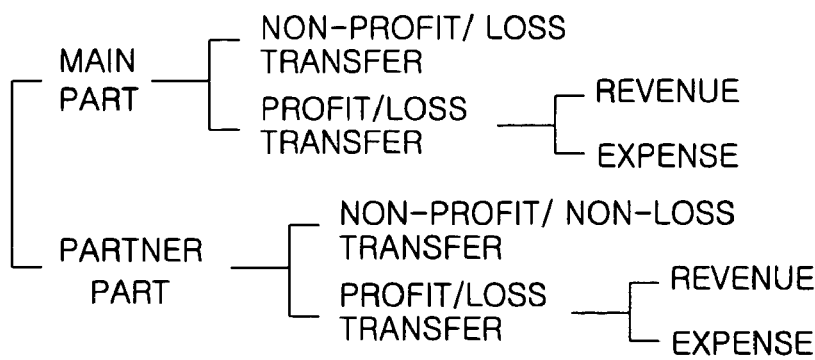

FIG. 9A

| CLASSIFICATION BASED ON FUNDAMENTAL CHARACTERISTICS OF TRANSACTION | CLASSIFICATION BASED ON ORIGINAL CHARACTERISTICS OF JOURNALIZING | | | |
|---|---|---|---|---|
| | MAIN TRANSACTION - FUNDAMENTAL TRANSACTION | MAIN TRANSACTION - INCIDENTAL TRANSACTION | PARTNER TRANSACTION - FUNDAMENTAL TRANSACTION | PARTNER TRANSACTION - INCIDENTAL TRANSACTION |
| PURCHASE TRANSACTION | SALES | V.A.T | IMMEDIATE SETTLEMENT TRANSACTION | SETTLEMENT DISCOUNT |
| | PREPAID SETTLEMENT TRANSACTION SALES | | SETTLEMENT FOR ENCASHMENT PREPAID SETTLEMENT TRANSACTION | |
| | SALES DEFERRED SETTLEMENT TRANSACTION | | DEFERRED SETTLEMENT TRANSACTION SETTLEMENT FOR ENCASHMENT | SETTLEMENT DISCOUNT |
| SALES TRANSACTION | SALES | V.A.T | IMMEDIATE SETTLEMENT TRANSACTION | SETTLEMENT DISCOUNT |
| | PREPAID SETTLEMENT TRANSACTION SALES | | SETTLEMENT FOR ENCASHMENT PREPAID SETTLEMENT TRANSACTION | |
| | SALES DEFERRED SETTLEMENT TRANSACTION | | DEFERRED SETTLEMENT TRANSACTION SETTLEMENT FOR ENCASHMENT | SETTLEMENT DISCOUNT |
| REVENUE TRANSACTION | REVENUE | | IMMEDIATE SETTLEMENT TRANSACTION | |
| | PREPAID SETTLEMENT TRANSACTION REVENUE | | SETTLEMENT FOR ENCASHMENT PREPAID SETTLEMENT TRANSACTION | |
| | REVENUE DEFERRED SETTLEMENT TRANSACTION | | DEFERRED SETTLEMENT TRANSACTION SETTLEMENT FOR ENCASHMENT | |

FIG. 9B

| CLASSIFICATION BASED ON FUNDAMENTAL CHARACTERISTICS OF TRANSACTION | CLASSIFICATION BASED ON ORIGINAL CHARACTERISTICS OF JOURNALIZING | | | |
|---|---|---|---|---|
| | MAIN TRANSACTION - FUNDAMENTAL TRANSACTION | MAIN TRANSACTION - INCIDENTAL TRANSACTION | PARTNER TRANSACTION - FUNDAMENTAL TRANSACTION | PARTNER TRANSACTION - INCIDENTAL TRANSACTION |
| EXPENSE TRANSACTION | EXPENSE | | IMMEDIATE SETTLEMENT TRANSACTION | |
| | PREPAID SETTLEMENT TRANSACTION EXPENSE | | SETTLEMENT FOR ENCASHMENT PREPAID SETTLEMENT TRANSACTION | |
| | EXPENSE DEFERRED SETTLEMENT TRANSACTION | | DEFERRED SETTLEMENT TRANSACTION SETTLEMENT FOR ENCASHMENT | |
| CASH INFLOW TRANSACTION | CASH BORROWING | | SETTLEMENT FOR ENCASHMENT | |
| | PAYMENT FOR CASH BORROWING | | SETTLEMENT FOR ENCASHMENT | PROFIT LOSS OF PAYMENT FAILURE |
| CASH OUTFLOW TRANSACTION | CASH LOAN | | SETTLEMENT FOR ENCASHMENT | |
| | CASH LOAN COLLECTION | | SETTLEMENT FOR ENCASHMENT | PROFIT LOSS OF COLLECTION FAILURE |
| | INVESTMENT | | SETTLEMENT FOR ENCASHMENT | |
| | INVESTMENT COLLECTION | | SETTLEMENT FOR ENCASHMENT | INVESTMENT PROFIT AND LOSS |
| TRANSFER ACCOUNT TRANSACTION NOT INVOLVING PROFIT OR LOSS | INCREASE AND/OR DECREASE OF ASSETS, CAPITALS, LIABILITIES, | | INCREASE AND/OR DECREASE OF ASSETS, CAPITALS, LIABILITIES, | |
| TRANSFER ACCOUNT TRANSACTION INVOLVING PROFIT OR LOSS | INCREASE AND/OR DECREASE OF ASSETS, CAPITALS, LIABILITIES, PROFIT AND LOSS | | INCREASE AND/OR DECREASE OF ASSETS, CAPITALS, LIABILITIES, PROFIT AND LOSS | |

FIG.9C

| NO | MAIN PART | | PARTNER PART | |
|---|---|---|---|---|
| | FUNDAMENTAL TRANSACTION | INCIDENTAL TRANSACTION | FUNDAMENTAL TRANSACTION | INCIDENTAL TRANSACTION |
| 111 | SALES | V.A.T WITHHOLDINGS | CREDIT SALES(CASH, BANK DEPOSIT) | SALES DISCOUNT |
| 112 | COLLECTION OF CREDIT SALES | — | BANK DEPOSIT(PREPAID EXPENSE,CASH,NOTES RECEIVABLE) | SALES DISCOUNT |
| 113 | PURCHASE | PREPAID V.A.T | CREDIT PURCHASE(CASH ,BANK DEPOSIT, TRADE FINANCING) | PURCHASE DISCOUNT |
| 114 | CREDIT PURCHASE SETTLEMENT | — | BANK DEPOSIT(PREPAID EXPENSE,CASH,NOTES PAYABLE) | PURCHASE DISCOUNT |
| 115 | LOAN | — | CASH , BANK DEPOSIT | INTEREST PAYMENT,FEE |
| 116 | DISPOSAL OF ASSETS | ACCUMULATED DEPRECIATION | CASH, BANK DEPOSIT, ACCOUNTS RECEIVABLE | GAIN/LOSS ON DISPOSAL |

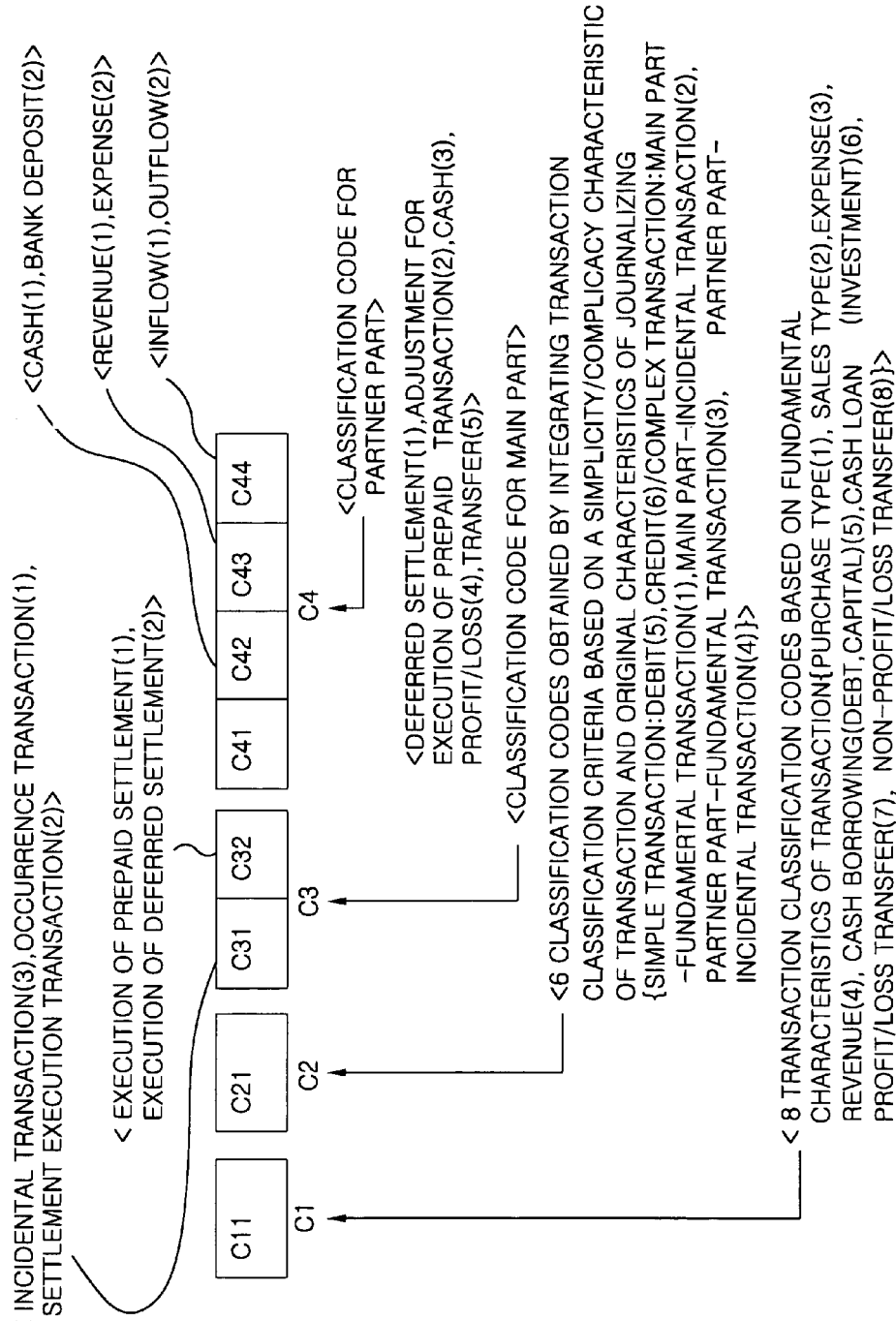

FIG.11A

| NO. | USER REFERENCE COLUMN | AUTOMATIC PROCESSING COLUMN |||||||
|---|---|---|---|---|---|---|---|---|
| | | ACCOUNT REFERENCE COLUMN || TRANSACTION CLASSIFICATION REFERENCE COLUMN ||||
| | TRANSACTION OUTLINE | DEBIT ACCOUNT | CREDIT ACCOUNT | TRANSAC-TION CLASSIFI-CATION CODE | DB CLASSIFI-CATION | COMPLEX TRANSAC-TION PATTERN NO. | USER CODE |
| 1 | MERCHANDISE CREDIT SALES | CREDIT SALES | MERCHANDISE SALES | 26121000 | A | – | C |
| 21 | NOTE COLLECTION FOR CREDIT SALES | NOTES RECEIVABLE | CREDIT SALES | 26221000 | A | – | C |
| 22 | CASH COLLECTION FOR CREDIT SALES | CASH | CREDIT SALES | 26223101 | A | – | C |
| 23 | BANK DEPOSIT COLLECTION FOR CREDIT SALES | BANK DEPOSIT | CREDIT SALES | 26223201 | A | – | C |
| 3 | MERCHANDISE CREDIT PURCHASE | MERCHANDISE | CREDIT PURCHASE | 15121000 | A | – | C |
| 4 | NOTE SETTLEMENT FOR CREDIT PURCHASE | CREDIT PURCHASE | NOTES PAYABLE | 15221000 | A | – | C |
| 5 | BOOK VALUE OF DISPOSED VEHICLE | | VEHICLES AND TRANSPORTATION EQUIPMENT | 21100000 | B | 99 | D |
| 6 | BOOK VALUE OF DISPOSED EQUIPMENT | | EQUIPMENT | 21100000 | B | 99 | D |
| 7 | PREPAID V.A.T OF DISPOSAL | | V.A.T WITHHOLDINGS | 22100000 | B | 99 | D |

A: SIMPLE JOURNALIZING   B: COMPLEX JOURNALIZING   C: SHARED   D: GENERAL AFFAIRS TEAM ONLY

FIG.11B

| NO. | USER REFERENCE COLUMN | AUTOMATIC PROCESSING COLUMN | | | | |
|---|---|---|---|---|---|---|
| | | ACCOUNT REFERENCE COLUMN | | TRANSACTION CLASSIFICATION REFERENCE COLUMN | | |
| | TRANSACTION OUTLINE | DEBIT ACCOUNT | CREDIT ACCOUNT | TRANSAC-TION CLASSIFI-CATION CODE | DB CLASSIFI-CATION | COMPLEX TRANSAC-TION PATTERN NO. | USER CODE |
| 8 | ADJUSTMENT OF ACCUMULATED DEPRECIATION ON DISPOSED VEHICLE | ACCUMULATED DEPRECIATION ON VEHICLE | | 22100000 | B | 99 | D |
| 9 | ASJUSTMENT OF ACCUMULATED DEPRECIATION ON DISPOSED EQUIPMENT | ACCUMULATED DEPRECIATION ON EQUIPMENT | | 22100000 | B | 99 | D |
| 10 | DISPOSAL OF ASSETS RECEIVED AS CASH | CASH | | 23003101 | B | 99 | D |
| 11 | DISPOSAL OF ASSETS RECEIVED AS BANK DEPOSIT | BANK DEPOSIT | | 23003201 | B | 99 | D |
| 12 | COLLECTION FAILURE OF DISPOSAL OF ASSETS | RECEIVABLE | | 23001000 | B | 99 | D |
| 13 | LOSS ON DISPOSAL OF ASSETS | LOSS ON DISPOSAL OF ASSETS | | 24004020 | B | 99 | D |
| 14 | PROFIT ON DISPOSAL OF ASSETS | | PROFIT ON DISPOSAL OF ASSETS | 24004010 | B | 99 | D |

A: SIMPLE JOURNALIZING    B: COMPLEX JOURNALIZING    C: SHARED    D: GENERAL AFFAIRS TEAM ONLY

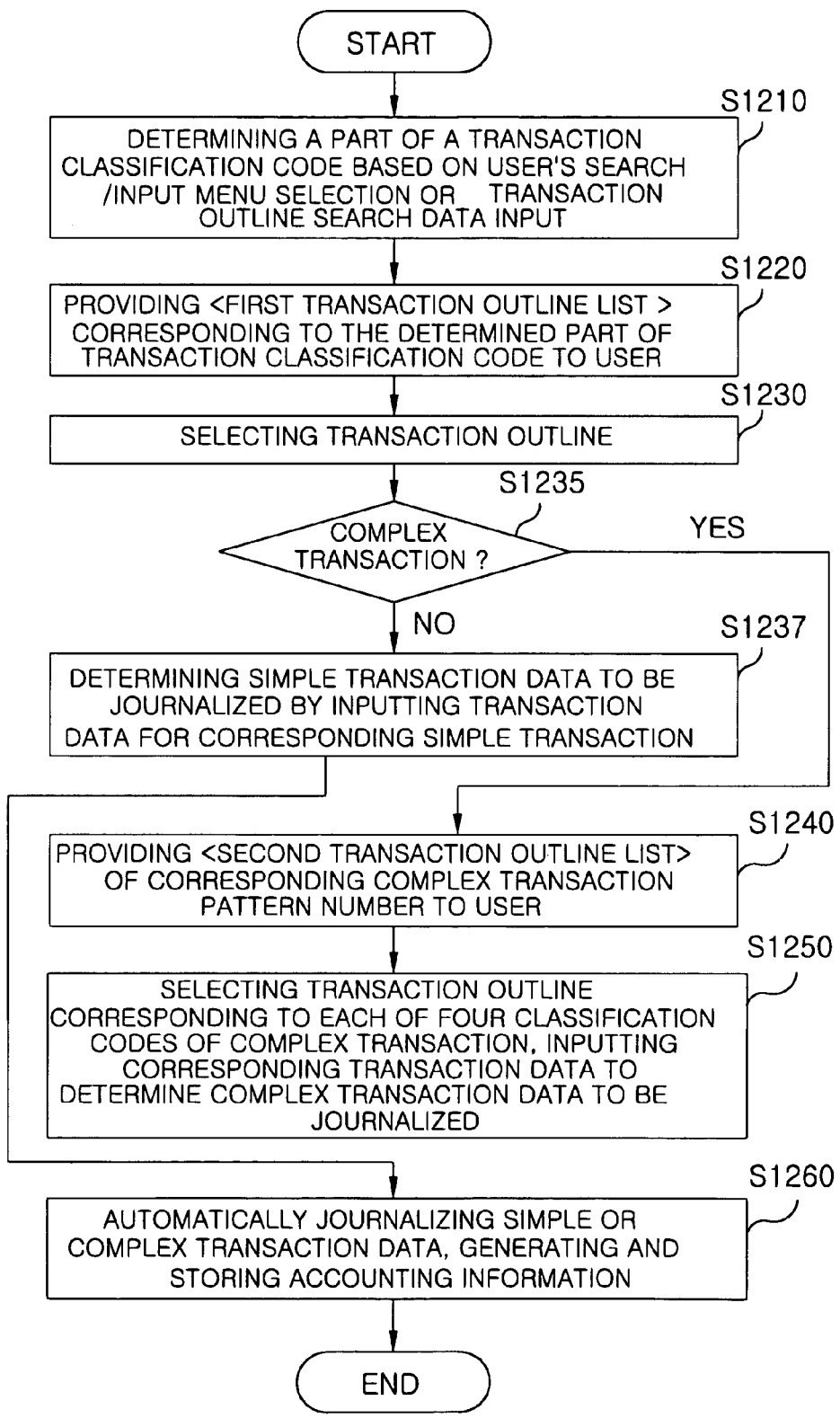

FIG. 13

| TRANSAC-TION NO. | JOUMALIZING NO. | TRANSAC-TION DATE | DEBIT/CREDIT | ACCOUNT | CLIENTS | TRANSACTION OUTLINE | TRANSAC-TION AMOUNT (WON) |
|---|---|---|---|---|---|---|---|
| 101 | 11 | 2002. 6. 1 | DEBIT | CREDIT SALES | A | MERCHANDISE CREDIT SALES | 1,200,000 |
| 102 | | 2002. 6. 1 | CREDIT | MERCHANDISE SALES | A | MERCHANDISE CREDIT SALES | 1,200,000 |
| 103 | 12 | 2002. 6. 10 | DEBIT | PAYMENT OF RENT | B | PAYMENT OF RENT | 400,000 |
| 104 | | 2002. 6. 10 | DEBIT | PREPAID V.A.T | B | EXPENSE-RELATED V.A.T | 40,000 |
| 105 | | 2002. 6. 10 | CREDIT | PAYABLE | B | REQUEST OF RENT PAYMENT AND V.A.T | 440,000 |
| 106 | 13 | 2002. 7. 5 | DEBIT | ACCUMULATED DEPRECIATION ON VEHICLES | C | ADJUSTMENT OF THE ACCUMULATED DEPRECIATION ON DISPOSED VEHICLE | 1,200,000 |
| 107 | | 2002. 7. 5 | DEBIT | BANK DEPOSIT | C | DISPOSAL OF ASSETS RECEIVED AS BANK DEPOSIT | 500,000 |
| 108 | | 2002. 7. 5 | DEBIT | RECEIVABLE | C | COLLECTION FAILURE OF DISPOSAL OF ASSETS | 200,000 |
| 109 | | 2002. 7. 5 | DEBIT | DEPOSITION LOSS OF ASSETS | C | LOSS ON DISPOSAL OF ASSETS | 100,000 |
| 110 | | 2002. 7. 5 | CREDIT | VEHICLES AND TRANSPORTATION EQUIPMENT | C | BOOK VALUE OF DISPOSED VEHICLE | 2,000,000 |

AUTOMATIC JOURNALIZING METHOD AND SYSTEM

This application is a Continuation-In-Part of PCT International Application No. PCT/KR2003/001192 filed on Jun. 18, 2003, which designated the United States.

FIELD OF THE INVENTION

The present invention relates to an automatic journalizing method and system; and, more particularly, to an automatic journalizing method and system employing a reverse-journalizing method.

BACKGROUND OF THE INVENTION

Various transactions in business activities of an enterprise should be converted into accounting data to be utilized as financial information necessary for management and administration of the enterprise. To convert basic data generated in the transactions into the accounting data in a journalizing process, the transactions are analyzed by using a double entry book-keeping principle. Specifically, accounts of debit and credit sides are determined and then amounts corresponding to each of the accounts are distributed based on balance of credits and debits in the journalizing process.

Recent development of information processing technology using computers makes fast processing of transaction data feasible. In this environment, various methods have been suggested and employed in order to automate the journalizing process, wherein the transaction data are converted into the accounting data (usually, financial accounting data).

A key technique for the automation of the journalizing process is to classify debits and credits and determine accounts based on 8 elements of transaction. That is, the matter of classifying types of transaction and determining debits and credits and accounts is of central importance in achieving the automation of the journalizing process. Hereinafter, conventional semi-automatic or automatic journalizing systems will be described.

In Korean Patent Laid-Open Publication No. 2002-0003666 (Patent Application No. 10-2000-0034993) (hereinafter, referred to as prior art #1), there is disclosed an automatic journalizing system using a key word search method. If a user inputs a familiar transaction word, e.g., a word 'payment', as a search keyword, account list information that can be matched with transaction outline data corresponding to the key word is offered to the user. Then, the user selects accounts to thereby enable journalizing.

Though the prior art #1 has an advantage in that it provides a semi-automatic journalizing system which a user, even a novice in accounting, can conduct the journalizing process, it also has a critical defect in that classification of debits and credits (hereinafter referred to as a D/C classification) cannot be automatically performed in this system. Thus, it is still the user who determines debits and credits. Therefore, in a case of a complex transaction, the complex transaction being defined herein as a transaction in which a plurality of accounts of debit and/or credit sides are involved at the same time, it is probable that the user fails to make a proper D/C classification. Further, in processing the complex transaction, the keyword search process and the journalizing process should be performed several times, wherein the user frequently has difficulty in selecting accounts. To ameliorate this problem, the prior art #1 employs an additional correcting process in which an expert examines the journalizing process and corrects errors therein. In this regard, it is apparent that the prior art #1 has a limit in implementing an automatic journalizing system. Furthermore, it happens frequently that a target transaction outline and accounts corresponding thereto are not found until the keyword search process is performed many times, thereby lowering its efficiency.

Japanese Patent Laid-Open Publication No. 2001-167221 (Patent Application No. 2000-797079) (hereinafter referred to as Prior Art #2) discloses a journalizing system using a two-step classification mechanism. In accordance with the journalizing system in the Prior Art #2, all transactions are classified into 16 patterns and the 16 patterns are offered to a user's computer screen. If the user selects one of them in a first step, detailed transaction items corresponding to the selected transaction pattern are displayed on the screen. Then, if the user selects one of the transaction items in the second step, an account corresponding to the selected transaction item is automatically determined.

As described, the Prior Art #2 classifies all transactions into the transaction patterns through the two-step classification mechanism. However, in case a transaction that belongs to none of the transaction patterns prescribed in the system is involved, journalizing thereof becomes very difficult and confusing. In other words, since the user should select one of the transaction patterns classified in the system in advance, flexibility in selecting a transaction pattern may not be secured. Further, in the case of a complex transaction, the user needs to separate the complex transaction into several simple transactions in order to use the automatic journalizing system in accordance with the Prior Art #2. Thus, it is difficult for a user, a novice in accounting, to use the system and there still exists limitation in achieving real automation of the journalizing process.

Korean Patent No. 10-0230455 (Patent Application No. 10-1997-0030825) (hereinafter referred to as Prior Art #3) suggests an automatic journalizing system in which a journalizing process is performed after a transaction type (e.g., cash inflow or cash outflow), a transaction pattern (e.g., purchase, storage of inventories in a warehouse, payment, etc., and sub-patterns thereof), and a transaction condition (e.g., cash, bank deposit, note, credit, setoff, etc.) are determined when a transaction occurs. To be specific, the transaction type, the transaction pattern and the transaction condition are designated by the user through input and selection of transaction data and, then, the journalizing process is performed based on these preset data.

The prior art #3 provides itemized transaction types to the user, thereby improving accuracy in the journalizing process. However, this system requires for the user to be familiar with accounting knowledge. Further, since the user should select one of the transaction types prescribed by the system, flexibility in selecting a transaction type may not be secured. Further, in a case of a complex transaction, the user needs to separate the complex transaction into several simple transactions in order to use the automatic journalizing system in accordance with the Prior Art #3. Thus, it is difficult for an accounting novice user to use the system of the Prior Art #3. In addition, there still exists limitation in achieving real automation of the journalizing process.

U.S. Pat. No. 6,085,173 and its corresponding Korean Patent Application No. 1993-0014324 which has been registered as Korean Patent No. 1996-001486 disclose an automatic journalizing method, which is referred to as prior art #4 hereinafter.

In the prior art #4, the user should determine for a transaction to which field, among 5 fields of 'purchase activity', 'sales activity', 'financial activity', 'production activity ' and 'management activity', the transaction belongs. If the user selects one of the five fields, a menu of secondary business activities in that field, the menu being already prepared in the system, is offered to the user, and the user chooses one of the secondary business activities from the menu. Then, if the user selects a settlement type (e.g., cash, bank deposit, credit, note, etc.) and inputs settlement amount, the system performs the journalizing process.

Although the prior art #4 succeeds in realizing automation of the journalizing process while improving user friendliness, there still exist unsolved problems that the journalizing process cannot be successfully performed in case a complex transaction is involved. Further, since it is required to specify all possible transaction patterns in a system processor unit in order to match the secondary business activities menu with final accounts in accordance with the prior art #4, construction of the system becomes very difficult. To reduce the construction difficulty of the system, it is inevitable to increase the user's burden in selecting menu and inputting data. Further, if, for example, a certain transaction involves "purchasing goods by getting a loan from a bank", it can be classified as a purchase activity and also as a financial activity. Thus, the duplicity of journalizing as in the above example may give the user difficulty in selecting the menu and the design of the system itself becomes difficult.

As described above, the conventional automatic journalizing methods and systems have many drawbacks. In order to overcome the limits of the conventional systems, a new automatic journalizing method and system should satisfy several requirements as follows. The new method and system should be able to correctly and fully match a transaction outline determined by a user with final accounts of debit and/or credit sides while improving friendliness to a novice. Further, the new system should be able to automatically process various transactions including a complex one. Furthermore, the system should be designed in such a way that it should be capable of providing a higher degree of flexibility for the user and overcome the processing difficulty caused by the duplicity of journalizing.

SUMMARY OF THE INVENTION

It is, therefore, an object of the present invention to provide an automatic journalizing method and system capable of enabling even a novice in accounting to conduct automatic journalizing of transaction data by employing a reverse journalizing method.

It is another object of the present invention to provide an automatic journalizing method and system capable of conducting accurate journalizing of transaction data by employing preset binary transaction classification criteria.

It is still another object of the present invention to provide an automatic journalizing method and system capable of enabling even a novice in accounting to correctly perform automatic journalizing for both a simple and a complex transaction just by retrieving and selecting a transaction outline and inputting transaction data by way of systematically integrating multi-aspects of transaction classification including fundamental characteristics of transaction, original characteristics of journalizing and a simplicity/complicacy characteristic of transaction.

In accordance with one aspect of the present invention, there is provided an automatic journalizing method for use in an automatic journalizing system connected to user interfaces through a communication network, the method comprising the steps of: (a) determining a plurality of transaction outlines based on previously prepared transaction outlines; (b) matching previously prepared 'accounts of debit and/or credit sides' (hereinafter, accounts of D/C) with each of the plurality of transaction outlines to thereby obtain 'account-matched transaction outlines'; (c) allotting a transaction classification code to each of the account-matched transaction outlines based on predetermined transaction classification criteria to thereby obtain 'account-matched transaction outlines having transaction classification codes'; (d) generating transaction outline information containing the 'account-matched transaction outlines having transaction classification codes' in a preset format to thereby render a transaction outline information DB; (e) controlling a user's access and log-in process to the system; (f) providing a search and input menu for allowing a user to retrieve transaction outlines, selecting a transaction outline and inputting transaction data; (g) automatically determining accounts of D/C corresponding to the transaction outline selected through the search and input menu; and (h) conducting automatic journalizing by using the determined accounts of D/C and the transaction data to thereby obtain accounting information and then storing the accounting information.

In accordance with another aspect of the present invention, there is provided an automatic journalizing system including a user information DB containing information to identify a user; an account list information DB having previously prepared 'accounts of debit and/or credit sides' (hereinafter, accounts of D/C); a transaction outline information DB containing transaction outline information having 'account-matched transaction outlines having transaction classification codes' obtained by a series of processes of determining a plurality of transaction outlines, matching the accounts of D/C with each of the transaction outlines to thereby obtain 'account-matched transaction outlines', and then allotting a transaction classification code to each of the 'account-matched transaction outlines'; an accounting information DB containing accounting information; a web server for intermediating a user to access the automatic journalizing system via user interfaces and a communications network to retrieve data from the automatic journalizing system and input necessary data thereto; and an automatic journalizing management server for controlling a series of processes for generating the transaction outline information DB, controlling a user's access and log-in to the automatic journalizing system via the web server based on the user information stored in the user information DB, providing the user with a user menu for 'retrieval and selection of a transaction outline and input of transaction data', automatically determining accounts of D/C corresponding to a selected transaction outline, conducting automatic journalizing by using determined accounts of D/C and inputted transaction data to thereby obtain accounting information and then storing the accounting information in the accounting information DB.

BRIEF DESCRIPTION OF THE DRAWINGS

The above and other objects and features of the present invention will become apparent from the following description of preferred embodiments given in conjunction with the accompanying drawings, in which:

FIGS. 5A to 5C describe a process for allotting transaction classification codes based on the preset binary classification criteria according to the settlement characteristics in accordance with the first preferred embodiment of the present invention;

FIG. 8 exemplifies transaction classification obtained by considering a division of 'a main (transaction) part' and 'a partner (transaction) part' based on original characteristics of journalizing in accordance with the third preferred embodiment of the present invention;

FIGS. 9A to 9C show transaction classification tables obtained by applying concepts of a 'fundamental transaction' and an 'incidental transaction' based on original characteristics of journalizing to each category of the 'main part' and the 'partner part' in accordance with the third preferred embodiment of the present invention;

FIG. 10 illustrates a transaction classification code system obtained by systematically integrating fundamental characteristics of transaction, original characteristics of journalizing and a simplicity/complicacy characteristic of transaction based on preset binary classification criteria in accordance with the third preferred embodiment of the present invention;

FIGS. 11A and 11B describe transaction outline information generated by matching accounts of debit and/or credit sides with each of transaction outlines based on the transaction classification code system in FIG. 10;

FIG. 12 offers a flowchart explaining a series of processes of searching for transaction outlines, generating accounting information and storing the accounting information; and FIG. 13 exemplifies accounting data generated in accordance with a preferred embodiment of the present invention.

DETAILED DESCRIPTION OF THE PREFERRED EMBODIMENT

Figure 1:
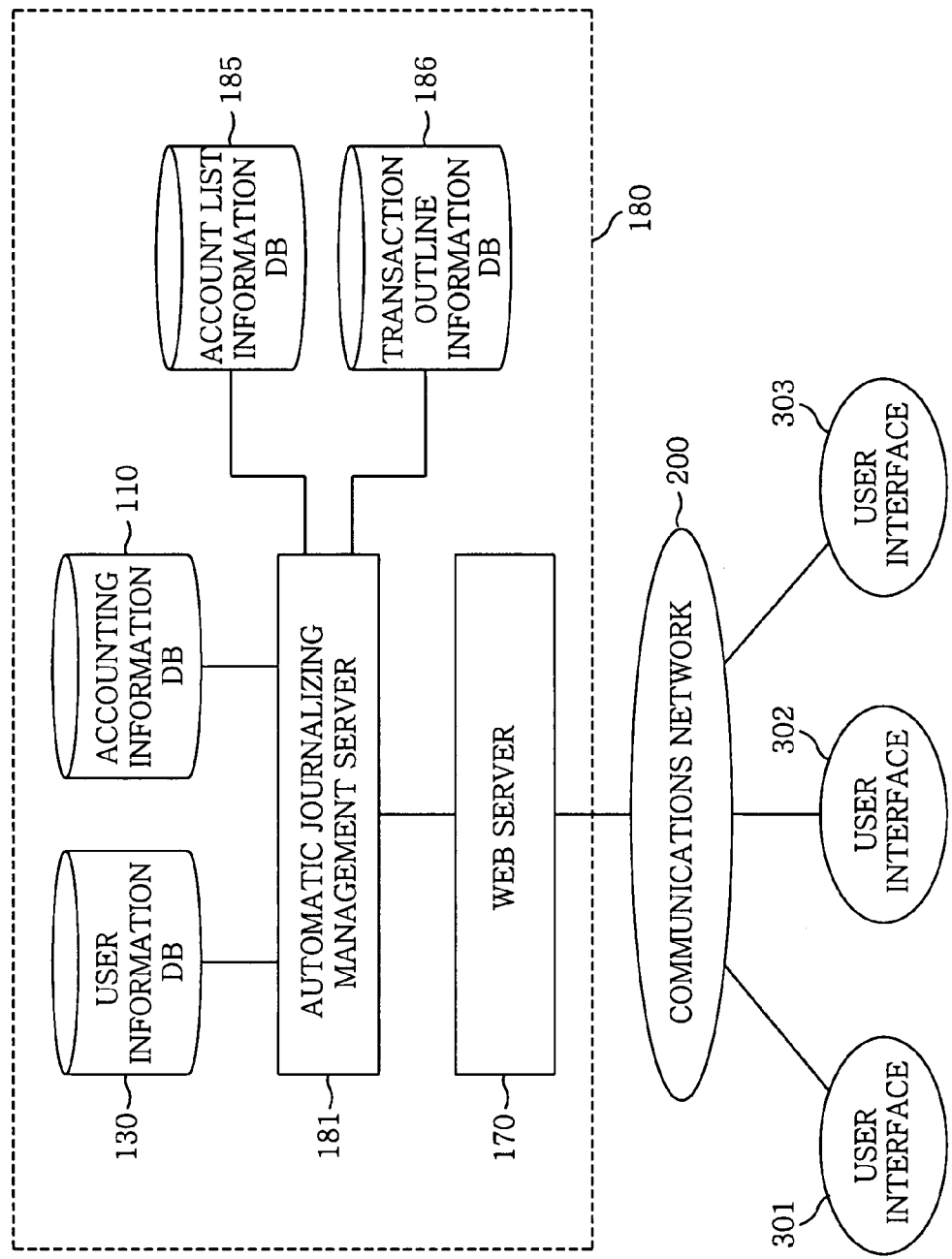
FIG. 1 is a schematic view of an automatic journalizing system and its peripheral systems in accordance with a preferred embodiment of the present invention.

Following terms are prominently used in a description of the invention, and each meaning thereof is as follows.

"Journalizing" is an accounting process for recording transactions in business activities of an enterprise. To be specific, journalizing is a process for selecting accounts of debit and credit sides (hereinafter referred to as accounts of D/C) by employing a double-entry book-keeping principle based on balance of debit and credit sides and then determining amount corresponding to each of the accounts.

"A transaction outline" is auxiliary text data that summarizes the content of a transaction. The transaction outline serves to facilitate an understanding of a user during the journalizing process.

"Ordinary transactions" represent general transactions in the course of ordinary internal and external business activities of the enterprise.

"A closing transaction" is a transaction of an accounting procedure of estimating and distributing assets, liabilities, capitals and costs, which is required to close ordinary business activities of the enterprise for a certain period of time and prepare a financial statement for reporting them.

"A purchase and sales activity transaction" is a profit-making activity of the enterprise. In the aspect of accounting, the purchase and sales activity transaction is a transaction pertaining to sales revenue and sales costs that determines sales profit.

"A managing activity transaction" refers to a transaction related to managing activities of the enterprise for supporting the purchase and sales activities thereof.

"An accrual basis transaction" refers to a transaction that should be recorded in the course of accounting process regardless of whether or not it involves cash flows. The accrual basis transaction (which can also be called as occurrence transaction) can be classified into two kinds: one is a transaction that requires an adjustment after the transaction and the other is a transaction that is terminated the moment it occurs.

"An adjustment transaction" is the first type accrual basis transaction, i.e., the transaction that is not terminated at the moment it occurs. The adjustment transaction can be further classified into "an adjustment-needed transaction" whose adjustment is deferred to the future time and "an adjustment execution transaction" for executing adjustment for the adjustment-needed transaction.

"A transaction involving cash flows" is a transaction which involves cash flows. The term "cash flows" herein used refers to inflows or outflows of cash, bank deposits and their equivalents.

"A transaction not involving cash flows" is a transaction that involves neither inflows nor outflows of cash, bank deposits or their equivalents.

"A revenue (income) transaction" means a transaction that causes increase in profit of the enterprise while "an expense transaction" refers to a transaction that accompanies profit decrease.

"A transaction with external sides" refers to a transaction carried out between the enterprise and an external entity while "a transaction with internal sides" refers to an internal transaction such as a transfer account transaction.

"A transfer account transaction" is an internal transaction and, specifically, refers to a transfer transaction between assets, capitals, liabilities, and profit and loss. The transfer account transaction can be classified into a "transfer account transaction not involving profit and loss" (TATNP) (e.g., transfer of cash into bank deposits or vice versa), "a transfer account transaction involving profit or loss (TATP)" (e.g., transfer of loss on valuation of inventory assets) and "a transfer account transaction for closing" (TATC) (e.g., depreciation of tangible fixed assets).

"A settlement transaction" is a transaction between the enterprise and an external party which accompanies encashment. The settlement transaction is classified into "an immediate settlement transaction" and "a prepaid or deferred settlement transaction". The immediate settlement transaction is a transaction where encashment is made at the same time the transaction occurs while the prepaid or deferred settlement transaction is a transaction in which the time of transaction occurrence and the time of encashment therefor are different.

"A prepaid transaction" refers to a transaction in which encashment is done before the occurrence of the transaction and a setoff is made later for the transaction that has occurred.

"A deferred settlement transaction" is a transaction in which encashment is deferred at the time the transaction occurs to be done later.

A technical essence of an automatic journalizing process in accordance with the present invention is to systematically integrate a process for enabling even a user, a novice in accounting, to readily input transaction outlines and amounts (hereinafter, referred to as a user inputting process) by composing user-friendly transaction outlines and a process for automatically determining debits and credits for transactions inputted by the user and matching accounts therewith (hereinafter referred to as an automatic journalizing process).

In order to achieve the above-cited technical object of the present invention, the automatic journalizing process of the present invention employs a reverse journalizing method. That is, unlike conventional journalizing methods where a step for (manually) selecting accounts, debits and credits (herein referred to as "a pre-process") is followed by a step for selecting or inputting transaction outlines containing the content of a transaction and inputting client information and amounts (herein referred to as "a post-process"), the order of the pre-process and the post-process is reversed in the automatic journalizing method of the present invention. Thus, in accordance with the present invention, the pre-process that requires an expert knowledge in accounting is performed after the post-process which can be easily conducted by even a user who is a novice in accounting.

By employing the above-described reverse journalizing method, automation of journalizing process can be realized in a simpler manner while providing a higher degree of flexibility to a user. In the present invention, a system manager or a user can modify or update transaction outline information stored in a transaction outline DB depending on situation and conditions of business activities without changing the design of the system. Thus, it becomes possible to meet various demands of the user.

Further, the present invention systematically integrates classification based on fundamental characteristics of transaction, wherein the classification is understandable by the user and based on original characteristics of journalizing, that is necessary for exact journalizing, by using preset binary classification criteria, thereby constructing a transaction classification system capable of effectively dealing with various complex transactions and implementing automatic journalizing while overcoming the difficulty of transaction classification due to the duplicity of journalizing.

Referring to FIG. 1, there is provided a schematic view of an automatic journalizing system 180 and its peripheral systems in accordance with a preferred embodiment of the present invention. The automatic journalizing system 180 includes a user information DB 130, an account list information DB 185, an accounting information DB 110, a transaction outline information DB 186, an automatic journalizing management server 181 and a web server 170. The peripheral systems of the automatic journalizing system 180 include user interfaces (UIs) 301 to 303 and a communications network 200.

Stored in the account list information DB 185 are data for information upon "accounts of debit and/or credit sides" (hereinafter referred to as accounts of D/C, e.g., accounts and their codes. Stored in the accounting information DB 110 is accounting information that is generated by the automatic journalizing process performed by the automatic journalizing management server 181. The web server 170 serves to intermediate a user to access the automatic journalizing system 180 via the user interfaces 301 to 303 and the communications network 200 to retrieve data from the automatic journalizing system 180 and input necessary data thereto.

The user information DB 130 contains information to identify a user, i.e. user information (e.g., an ID, a password, a phone number, an address of the user). Prepared in the transaction outline DB 186 is transaction outline information containing 'account-matched transaction outlines having classification codes' obtained through a series of processes of preparing and determining a plurality of transaction outlines, matching the accounts of D/C stored in the account list information DB 185 with each of the transaction outlines to thereby obtain 'account-matched transaction outlines' and then allotting a transaction classification code to each of the account-matched transaction outlines based on predetermined transaction classification criteria.

The automatic journalizing management server 181 controls a process of generating the transaction outline information DB 186, which is to be described later with reference to FIG. 3. Further, the automatic journalizing management server 181 controls a log-in process of the user accessing the journalizing system via the web server 170 based on the user information stored in the user information DB 130. The automatic journalizing management server 181 then provides the user with a search and input menu for 'retrieval and selection of a transaction outline and input of necessary data' through the web server 170. Thereafter, the automatic journalizing management server 181 automatically determines accounts of D/C corresponding to the transaction outline selected by the user and conducts the automatic journalizing by using the determined accounts of D/C and the transaction data inputted by the user to thereby obtain accounting information. Then, the automatic journalizing management server 181 stores the accounting information in the accounting information DB 110.

The operation of the automatic journalizing management server 181 related to the retrieval and the selection of the transaction outline and the automatic journalizing will be described in detail hereinafter. The automatic journalizing management server 181 retrieves transaction outline information stored in the transaction outline information DB (186) based on data for the retrieval of the transaction outline inputted by the user, which may be, for example, a transaction type designated by the user, and then determines a transaction classification code. Thereafter, the automatic journalizing management server 181 extracts transaction outline data corresponding to the determined transaction classification code from the transaction outline information DB 186 and provides the extracted transaction outline data, e.g., a transaction outline list, to the user, allowing the user to select a transaction outline. Then, the automatic journalizing management server 181 automatically determines accounts of D/C corresponding to the transaction outline selected by the user and performs the journalizing by using the determined accounts of D/C and the transaction data inputted by the user to thereby obtain accounting information. The accounting information is stored in the accounting information DB 110.

Figure 2:
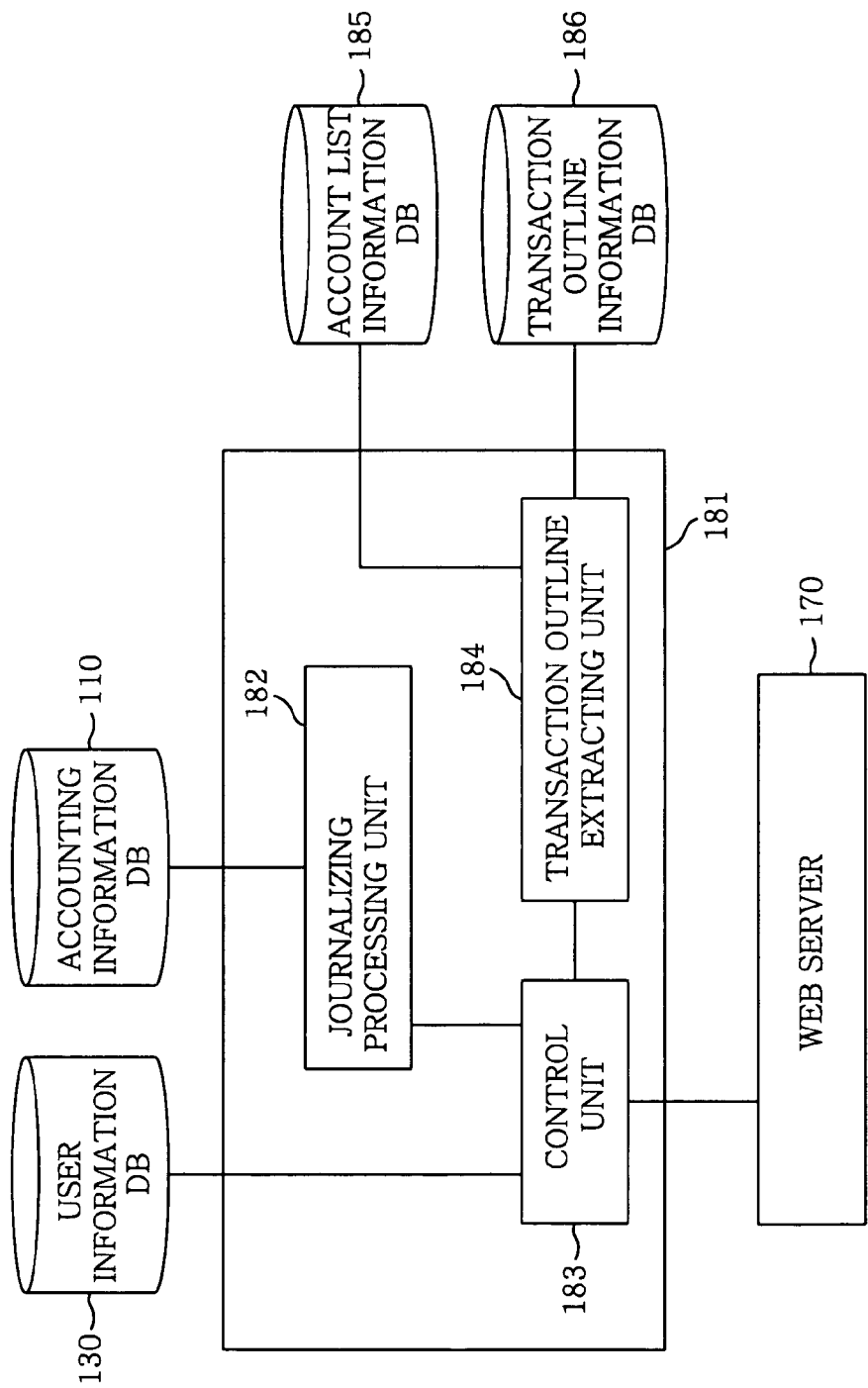
FIG. 2 illustrates an automatic journalizing management server shown in FIG. 1.

FIG. 2 illustrates a structure of the automatic journalizing management server 181 shown in FIG. 1 in accordance with a preferred embodiment of the present invention. The automatic journalizing management server 181 includes a journalizing processing unit 182, a control unit 183 and a transaction outline extracting unit 184.

The control unit 183 controls the login process of the user accessing the automatic journalizing management server 181 via the web server 170 based on the user information stored in the user information DB 130. Further, the control unit 183 sends the data for the retrieval (i.e., search) of the transaction outline inputted by the user to the transaction outline extracting unit 184 and then provides the user with at least one transaction outline data received from the transaction outline extracting unit 184 via the web server 170. Further, the control unit 183 provides the journalizing processing unit 182 with the transaction outline selected by the user and the transaction data inputted by the user.

The transaction outline extracting unit 184 mediates the process for generating the transaction outline information DB 186 by utilizing the account list information DB 185. Further, the transaction outline extracting unit 184 determines a transaction classification code based on the data for the retrieval of the transaction outline inputted by the user which is received from the control unit 183 and then extracts transaction outline data, e.g., the transaction outline list, from the transaction outline information DB 186. The extracted transaction outline data is sent to the control unit 183.

The journalizing processing unit 182 receives the transaction outline selected by the user from the control unit 183 and then automatically determines the accounts of D/C corresponding thereto. Then, the journalizing processing unit 182 performs the automatic journalizing by using the determined accounts of D/C and the transaction data to thereby obtain the accounting information and then stores the accounting information in the accounting information DB 110.

Figure 3:
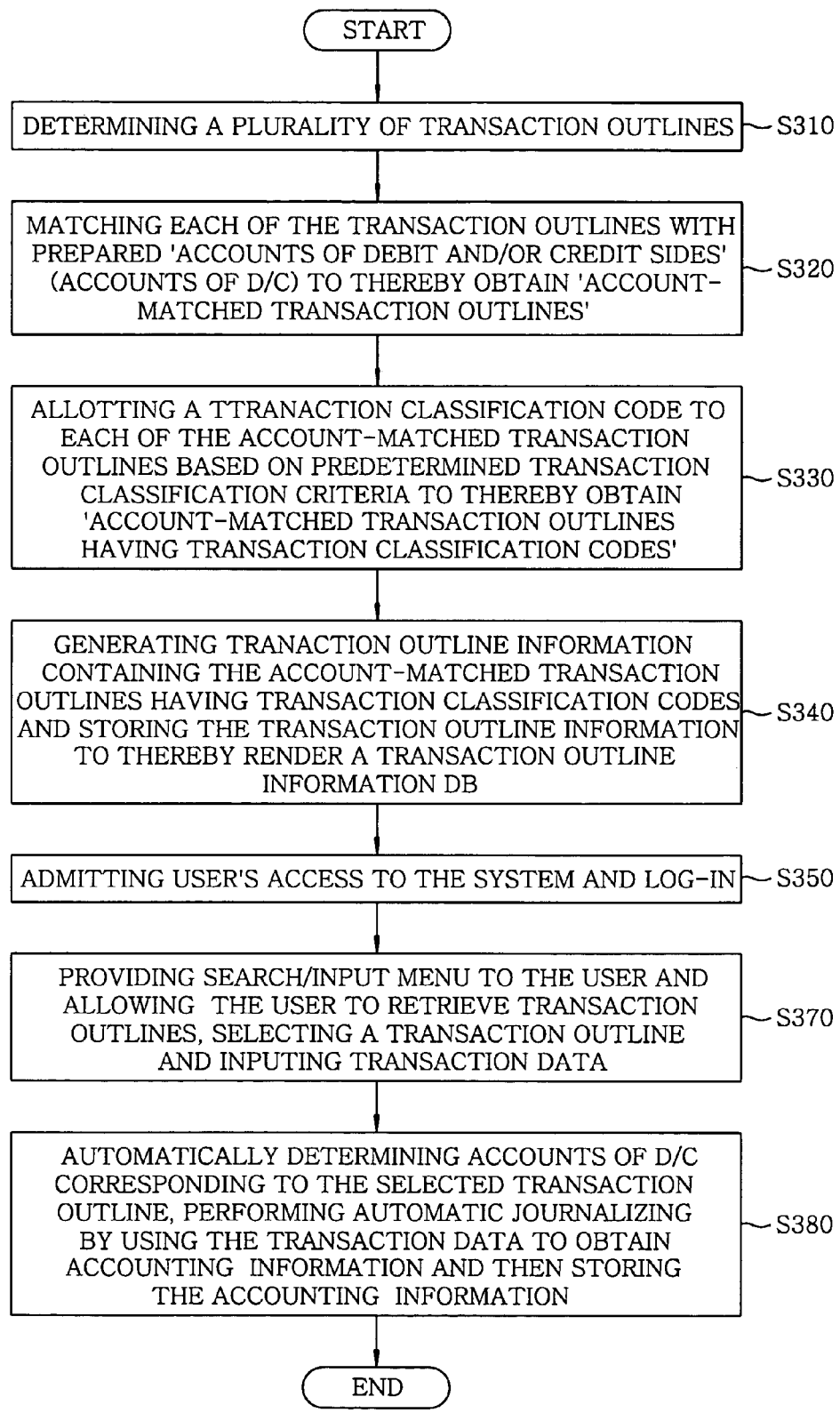
FIG. 3 provides a flowchart of an automatic journalizing process in accordance with the present invention.

Referring to FIG. 3, there is depicted a flowchart describing the automatic journalizing method in accordance with the present invention.

First, a plurality of transaction outlines is determined based on previously prepared transaction outlines(at step S310). In detail, transaction outlines are previously prepared in the system 180 (e.g., in a memory (not shown) within the server 181 or in the DB 186). The system 180 may offer a determination guide menu as a user menu for allowing a system manager (or a user) to determine transaction outlines based on the previously prepared transaction outlines. A system builder may previously prepare transaction outlines as a standard transaction outline list that can appear during business activities of a certain business enterprise that uses the automatic journalizing system 180. The previously prepared transaction outlines can be updated and in turn determined as transaction outlines. For example, the system manager or a user can access the transaction outline information DB 186 via the control unit 183 and the transaction outline extracting unit 184 to input a new transaction outline or modify the previously prepared transaction outlines by using the determination guide menu (not shown) provided via the web server 170 before or during (usually before) the normal use of the system 180. The updated transaction outlines as described above are set as the determined transaction outlines. If the system manager or the user does not update the previously prepared transaction outlines, the previously prepared transaction outlines are automatically set as determined transaction outlines.

After the completion of the step S310, each of determined transaction outlines is matched with previously prepared accounts of D/C to thereby obtain 'account-matched transaction outlines' (Step S320). In detail, the management server 181 may provide a matching guide menu as a user menu via the web server 170. The system 180 allows a system manager or a licensed user (who is an expert in accounting), with the aid of the matching guide menu, to access the account list information DB 185 and to match each of the determined transaction outlines with corresponding accounts of D/C by using previously prepared accounts of D/C, e.g., account list information stored in the DB 185. As a result, 'account-matched transaction outlines' are obtained in the system 180.

Thereafter, at step S330, a transaction classification code is allotted to each of the account-matched transaction outlines based on predetermined transaction classification criteria to thereby obtain 'account-matched transaction outlines having classification codes'. In detail, at step S330, the management server 181 may provide an allotment guide menu as a user menu via the web server 170. The system 180 allows a system manager or a licensed user, with the aid of the allotment guide menu, to allot a corresponding transaction classification code to each of the account-matched transaction outlines by using transaction classification codes which have been previously prepared in accordance with a predetermined transaction classification criteria and then stored in a memory (in the server 181) (not shown). As a result, 'account-matched transaction outlines having transaction classification codes' are obtained in the system 180. From now on, predetermined transaction classification criteria will be described in detail.

Figure 4:
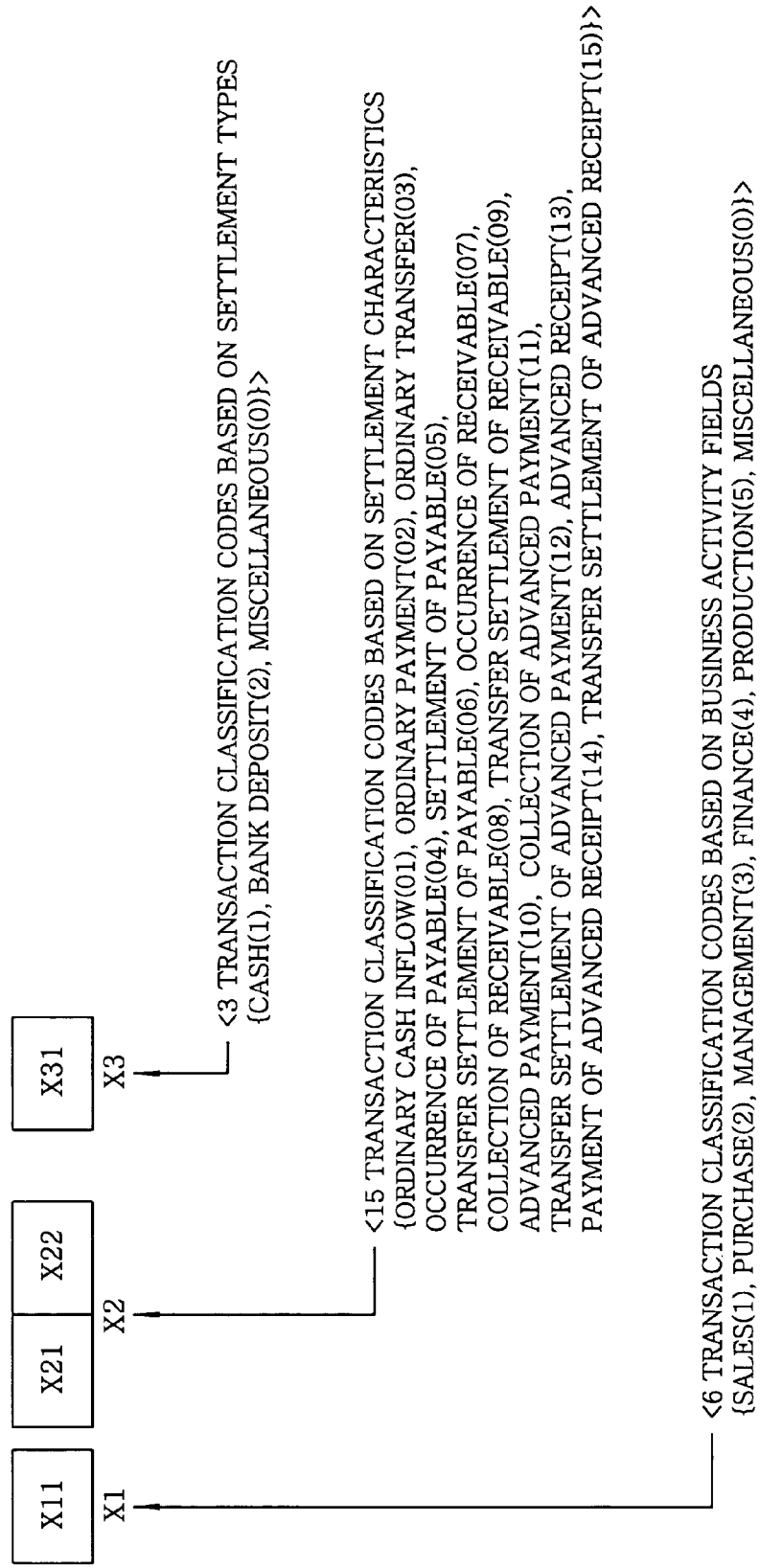
FIG. 4 shows a structure of transaction classification codes including transaction classification codes using preset binary classification criteria based on settlement characteristics in accordance with a first preferred embodiment of the present invention.

Predetermined or preset transaction classification criteria in accordance with the preferred embodiment of the present invention include 'transaction classification codes based on the characteristics of settlement' (codes X21 and X22 in region X2 in FIG. 4).

Figure 5C:
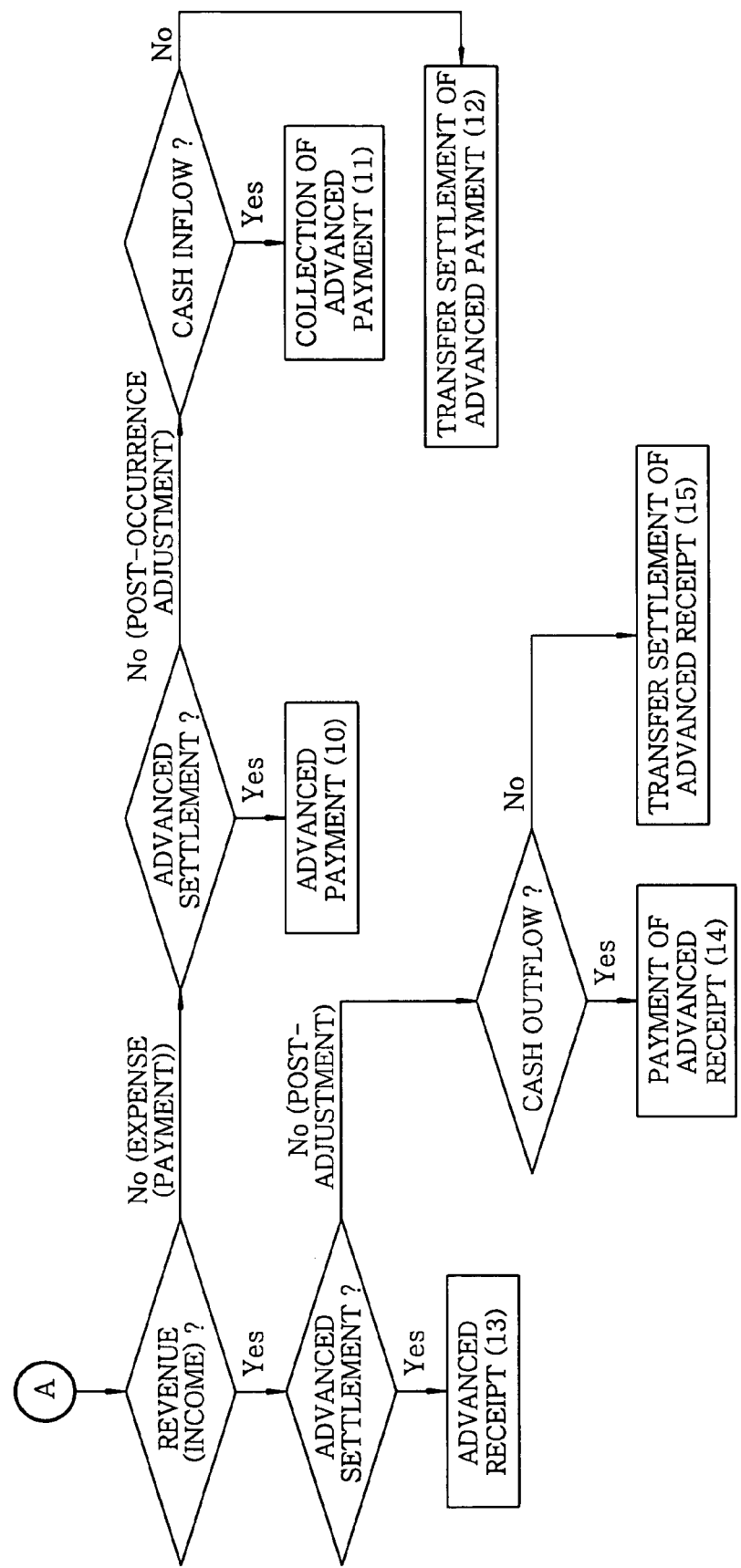

Referring to FIG. 4, there are exemplified transaction classification codes including transaction classification codes using preset binary classification criteria based on the settlement characteristics in accordance with a first preferred embodiment of the present invention. FIGS. 5A to 5C are flowcharts for creating transaction classification codes based on the settlement characteristics shown in FIG. 4 by allotting transaction classification codes based on the preset binary classification criteria according to the settlement characteristics in accordance with the first preferred embodiment of the present invention. The reference numbers in parentheses in FIGS. 5A to 5C represent 15 transaction classification codes in accordance with a preset binary classification criterion based on the settlement characteristics described in FIG. 4.

It is also preferable to use 'transaction classification codes based on activity fields' (codes X11 in region X1 in FIG. 4) and 'transaction classification codes based on settlement types' (codes X31 in region X3 in FIG. 4) as auxiliary transaction classification criteria in addition to the transaction classification codes based on the settlement characteristics. The transaction classification codes based on the activity fields are used to allocate transaction classification codes by classifying the fields of the business activities.

For example, a transaction of 'payment of payroll' is classified as a managing activity in the aspect of 'activity fields' and as an ordinary payment in the aspect of 'settlement characteristics' with its settlement type being defined as cash. Thus, the transaction of payroll payment is given a transaction code '3021'. For another example, a transaction of 'collection of bank deposits for credit sales' is given a transaction code '1082'.

Referring to FIGS. 6A to 6D, there are depicted flowcharts for allotting transaction classification codes by using preset binary classification criteria based on the fundamental characteristics of transaction in accordance with a second preferred embodiment of the present invention. The fundamental characteristics of transaction based on the preset binary classification criteria and the transaction classification codes corresponding thereto are exemplified in Table 1 as follows.

TABLE 1

| Transaction Activity | | Transaction Classification Code | |
|---|---|---|---|
| Transaction Classification Based on Fundamental Characteristics of Transaction | | | |
| Ordinary Activity Transaction | Closing Activity Transaction | 1 | 2 |
| Purchase and Sales Activity Transaction | Managing activity transaction | 1 | 2 |
| Occurrence Transaction | Adjustment Transaction | 1 | 2 |
| Transaction involving cash flows | Transaction not involving cash flows | 1 | 2 |
| Auxiliary Transaction Classification | | | |
| Revenue Transaction | Expense Transaction | 1 | 2 |
| Cash Inflow Transaction | Cash Outflow Transaction | 1 | 2 |
| Cash Transaction | Bank Deposit Transaction | 1 | 2 |

If a transaction dose not belong to any of the auxiliary transaction classification categories, its transaction code is set as 0.

Figure 6A:
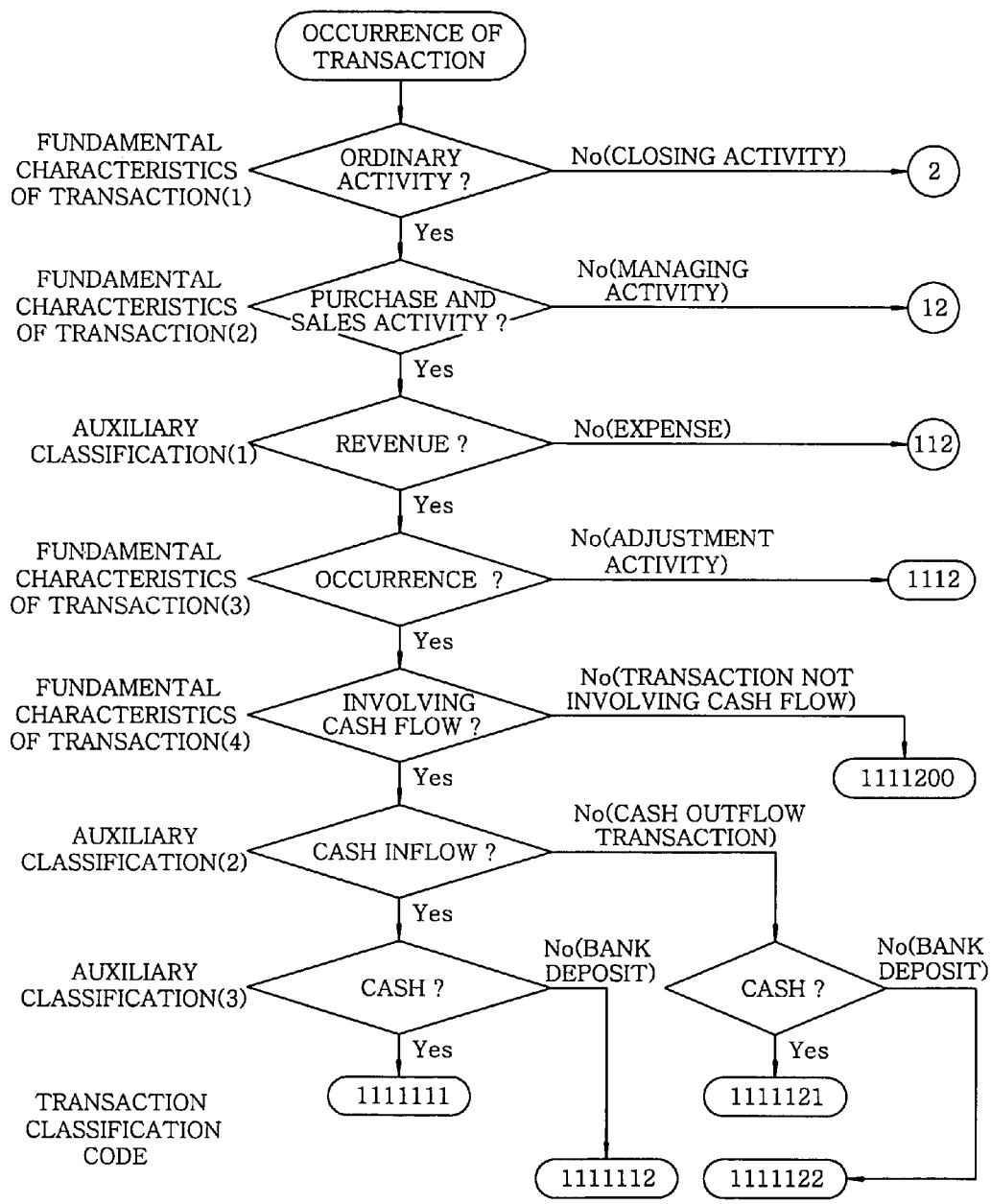
FIGS. 6A to 6D offer flowcharts of a process for allotting transaction classification codes based on preset binary classification criteria according to fundamental characteristics of transaction in accordance with a second preferred embodiment of the present invention.
Figure 6B:
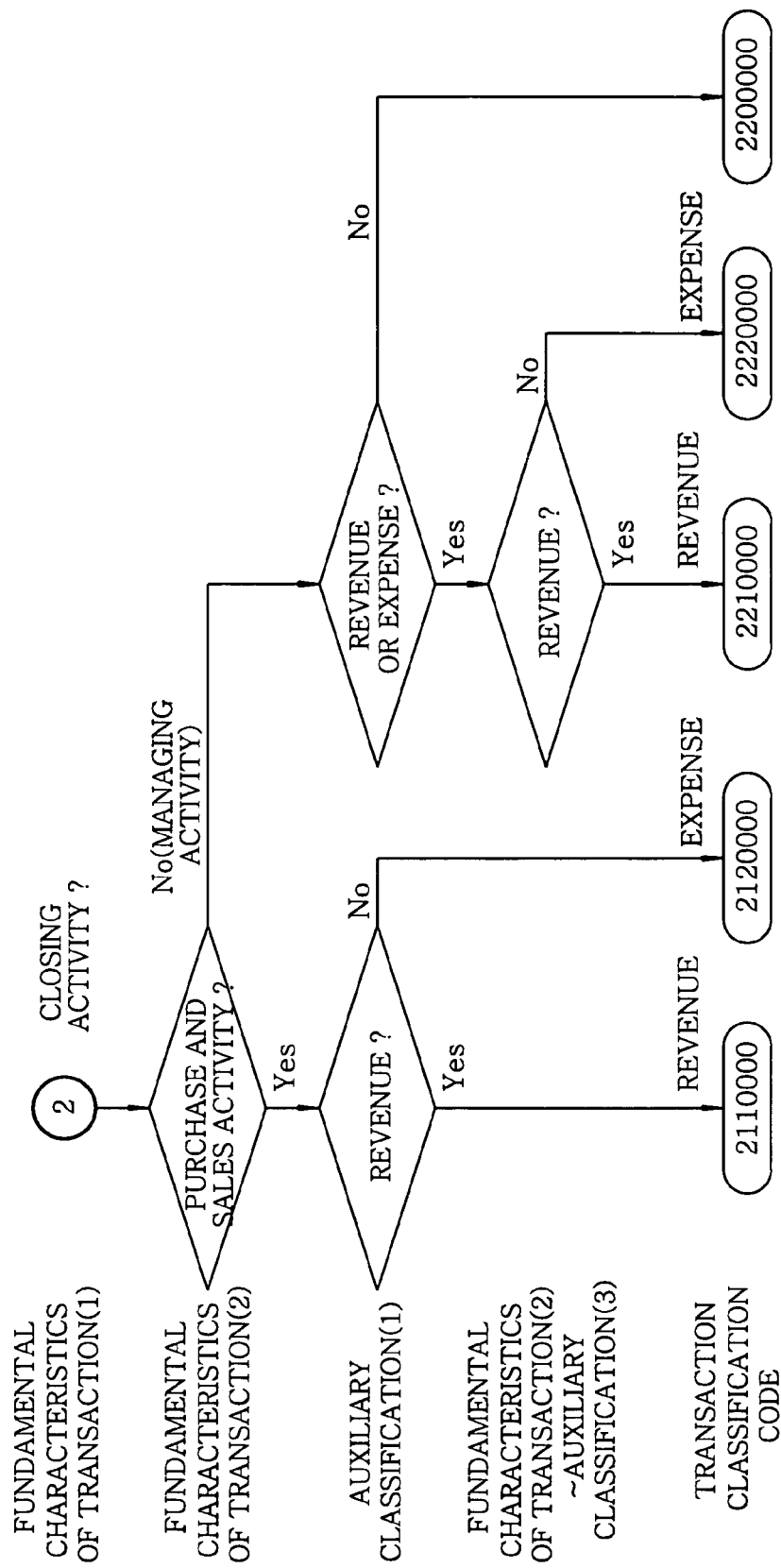

As shown in FIG. 6A, if a transaction is found to be an ordinary activity transaction (1), a purchase and sales activity transaction (1), a revenue transaction (1), an occurrence transaction (1), a transaction involving cash flows (1), a cash inflow transaction (1) and a cash transaction (1), its transaction classification code is determined as "1111111". If a transaction is estimated as a closing activity transaction (2), a managing activity transaction (2) and a transaction as neither revenue nor expense (0), its transaction classification code is defined as "2200000".

Figure 6C:
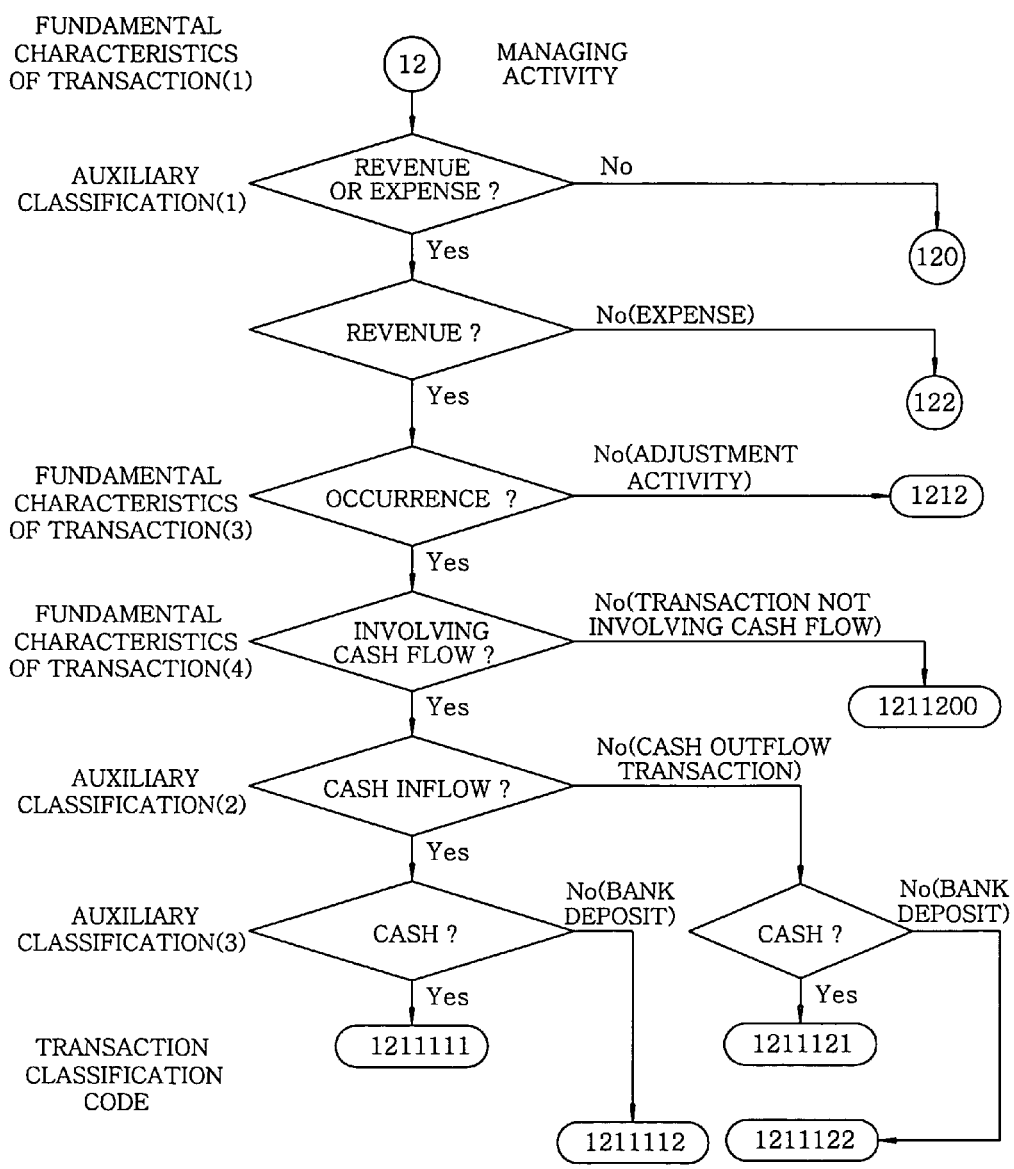

As shown in FIG. 6C, if a transaction is classified as an ordinary activity transaction 1, a managing activity transaction 2, a revenue transaction 1, an occurrence transaction 1, and a transaction not involving cash flows 2, its transaction classification code is outputted as "1211200". Meanwhile, if a transaction is classified as an ordinary activity transaction 1, a managing activity transaction 2, a revenue transaction 2, an occurrence transaction 1, a transaction involving cash flows 1, a cash outflow transaction 2 and a bank deposit transaction 2 as illustrated in FIG. 6D, its transaction classification code is outputted as "1221122".

Figure 6D:
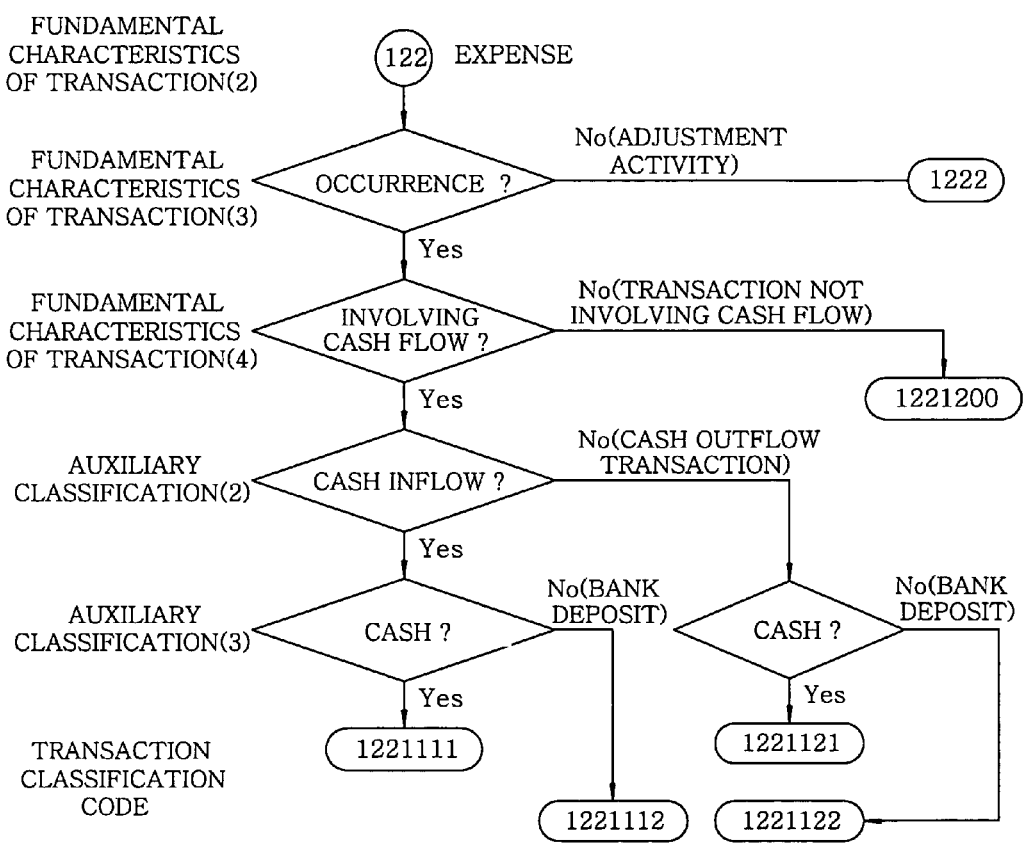

As can be seen from FIGS. 6C and 6D, a transaction classification process in a second preferred embodiment of the present invention includes seven steps, i.e., a four-step transaction classification based on fundamental characteristics of a transaction and a three-step auxiliary transaction classification. Each of the transaction classification steps is based on preset binary transaction classification criteria.

The four-step transaction classification based on fundamental characteristics of a transaction outputs 16 ($2^4$=16) transaction classification codes. In case of the three-step auxiliary classification, a first step has two pairs of alternative selection paths (i.e., a selection of either one of revenue and expense, and a selection of 'neither revenue nor expense'). Thus, the three-step auxiliary classification is considered to have four pairs of alternative selection paths, so that 16 ($2^4$=16) transaction classification codes are outputted. The aforementioned term 'binary classification criteria' refers to alternative paths for use in allotting transaction classification codes.

The total number of transaction classification codes that can be outputted in accordance with the second preferred embodiment of the present invention is 256 ($2^8$=256) to the maximum. However, the number of transaction classification codes that are actually outputted is smaller than 256 due to correlations between classification criteria.

For example, in the case of a code "11112" corresponding to a transaction not involving cash flows outputted through the first to the fifth step in FIG. 6A, the last two digits of the code are determined as "00" without proceeding to the remaining sixth and the seventh step. That is, since the transaction is not involving cash flows, it is needless to divide the transaction into 'a cash inflow transaction or a cash outflow transaction' and, further, into 'a cash transaction or a bank deposit transaction'. Thus, the final seven-digit transaction classification code of the transaction not involving cash flows is defined as "1111200". All transactions can be properly classified by undergoing through the seven-step transaction classification process (the four-step transaction classification based on fundamental characteristics of a transaction and the three-step auxiliary transaction classification) using the preset binary classification criteria, thereby enabling journalizing of transaction data.

Meanwhile, in accordance with a third preferred embodiment of the present invention, the automatic journalizing is performed by using a transaction classification code system built by integrating <fundamental characteristics of transaction>, <original characteristics of journalizing>, and <a simplicity/complicacy characteristic of transaction> based on preset binary classification criteria.

Unlike the second preferred embodiment, the third preferred embodiment takes following facts into consideration in order to classify a transaction based on fundamental characteristics of transaction. A specific description thereof is as follows. First, transactions of an enterprise are classified into a transaction with an external side and that with an internal side. As defined earlier, the transaction with an external side refers to a transaction carried out between the enterprise and an external entity while the transaction with an internal side means an internal transaction such as a transfer account transaction. Second, every transaction of the enterprise can be classified into a transaction involving profit or loss and a transaction not involving profit and loss, wherein the transaction involving profit or loss is classified again into a transaction accompanying revenue or corresponding cost (e.g., a merchandise sales) and a transaction accompanying expense or corresponding cost (e.g., a payment of rent). Third, transactions not involving profit and loss among transactions with an external side are classified into cash borrowing transactions (debt, capital, etc.,) and cash investment transactions.

Figure 7:
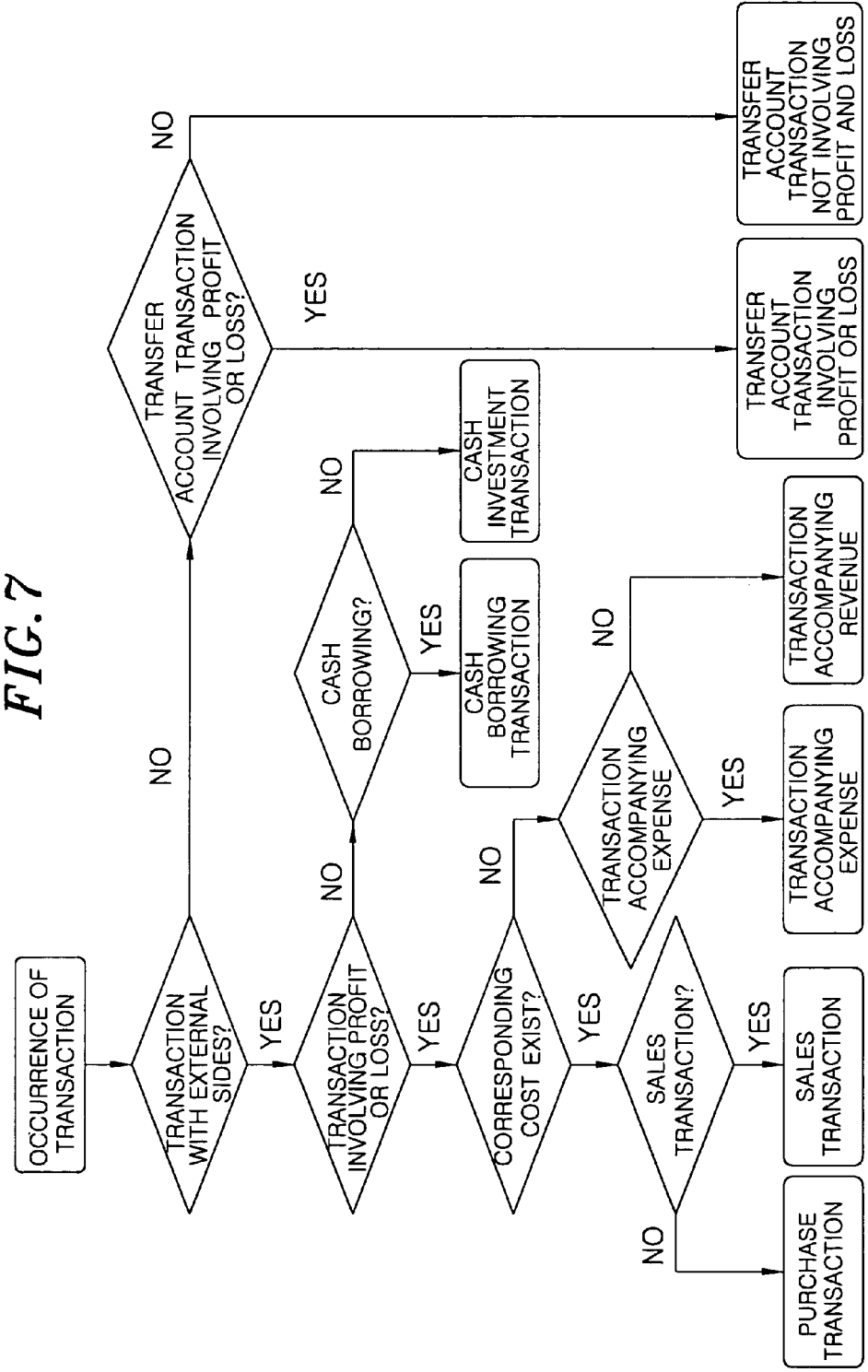
FIG. 7 sets forth a flowchart for defining a transaction by using the preset binary classification criteria based on the fundamental characteristics of transaction in accordance with a third preferred embodiment of the present invention.

In the third preferred embodiment of the present invention based on the above considerations, transactions are classified into <a transaction with an external side or a transaction with an internal side, <a transaction involving profit or loss or a transaction not involving profit and loss>, <a cash inflow transaction or a cash outflow transaction>, and <a transaction with cost or a transaction without cost>. As a result, the transaction is classified into eight types such as 'a purchase transaction or a sales transaction', 'a transaction accompanying expense or a transaction accompanying revenue', 'a cash inflow transaction or a cash outflow transaction', and 'a transfer account transaction involving profit or loss or a transfer account transaction not involving profit and loss'. FIG. 7 provides a flowchart for illustrating a process for classifying a transaction by applying the preset binary classification criteria based on the fundamental characteristics of transaction in accordance with the third preferred embodiment of the present invention.

In the third preferred embodiment, in addition to the classification criteria based on the fundamental characteristics of transaction, classification criteria based on original characteristics of journalizing are also applied to classify transaction. In this case, it should be noted that every activity of the enterprise has the purpose of gaining profit and converting the gained profit into cash. And also, the enterprise terminates every transaction with an external side by converting profit into cash. The process for converting profit into cash (encashment process) is divided into an immediate encashment transaction and a deferred settlement (e.g., a note settlement, a card settlement, and a credit settlement). The deferred settlement appears in a settlement required transaction, in which encashment is made through a settlement execution transaction.

At the time of performing journalizing of transaction data, a transaction is analyzed to have a 'main (transaction) part' and a 'partner (transaction) part'. The 'main part' indicates an aspect of transaction related to activities for gaining profit, and the 'partner part' represents an aspect of transaction related to a result pertaining to encashment followed by the profit-gaining activities.

In accordance with the third preferred embodiment of the present invention, an automatic journalizing is performed by considering such original characteristic of journalizing, i.e., the fact that a single transaction has both main part and partner part. FIG. 8 presents an exemplary transaction type classified based on the original characteristic of journalizing, i.e., by considering the 'main part' and the 'partner part' of a transaction in accordance with the third preferred embodiment of the present invention. By considering the main part and the partner part of the transaction, it becomes possible to enhance user friendliness and performance accuracy of the automatic journalizing.

Further, in the third preferred embodiment of the present invention, preset binary classification criteria based on a simplicity/complicacy characteristic of transaction are applied to classify a transaction. Such preset binary classification criteria classify a transaction into a simple transaction or a complex transaction. In case of a simple transaction, a 'main part' is matched with a 'partner part' as one-to-one correspondence. In a complex transaction, on the other hand, a 'main part' and a 'partner part' are matched as one-to-one, one-to-many, or many-to-many correspondence.

FIGS. 9A to 9C represent tables illustrating a transaction classification in which the 'main part' and the 'partner part' are matched with a 'fundamental transaction' and an 'incidental transaction' based on original characteristics of a journalizing in accordance with the third preferred embodiment of the present invention.

The 'fundamental transaction' can be distinguished from the 'incidental transaction' in that the 'fundamental transaction' plays a key role in achieving original purposes (gaining profit/converting profit into cash) of a transaction and is more significant than the incidental transaction (e.g., in terms of transaction amounts). Referring to FIG. 9C, there is illustrated a 'credit sales transaction'. A 'main part' thereof includes 'sales' (credit side) as a fundamental transaction and 'value added tax (VAT) withholding' (credit side) as an incidental transaction. A 'partner part' thereof includes 'credit sales' (debit side) as a fundamental transaction and 'sales discount' (debit side) as an incidental transaction.

When a complex transaction is journalized, a user can select one among four access paths 'main part—fundamental transaction', 'main part—incidental transaction', 'partner part—fundamental transaction' and 'partner part—incidental transaction'. Then, the system 180 provides data about the other three access paths except for the access path selected by the user. Further, a guide menu is provided so that the user can select one of the remaining three access paths. By using this mechanism, the system 180 provides the guide menu so that the user can accurately select a transaction outline and input transaction data, no matter what the user first selects among the above-described four access paths, thereby performing an automatic journalizing.

For example, in case a user does not fully understand characteristics of a complex transaction to be journalized but knows that it is a 'revenue received as a bank deposit', the user can select a 'bank deposit' from a transaction outline menu. Then, the system 180 provides the user with transaction outline data including the 'bank deposit' as 'a fundamental transaction item of a partner part' by using the transaction classification structure illustrated in FIGS. 9A to 9C. Based on the guide menu provided by the system 180, the user can select data about the other three access paths, i.e., 'main part—fundamental transaction', 'main part—incidental transaction', and 'partner part—incidental transaction'. The specific examples thereof will be described later with reference to FIG. 13.

FIGS. 9A to 9C also exemplify a transaction classification in which preset binary classification criteria based on fundamental characteristics of a transaction are integrated with those based on original characteristics of journalizing in accordance with the preferred embodiment of the present invention. As can be seen from FIGS. 9A to 9C, the third preferred embodiment of the present invention discloses an automatic journalizing method capable of solving complexity/duplicity problem of transaction by systematically integrating 'a convenient transaction outline selection of a user' and 'an accurate automatic journalizing' by the system 180.

Based on the above-described transaction classification criteria used in the step S330, a four-digit code is outputted in the first preferred embodiment as shown in FIG. 4, and a seven-digit code is outputted in the second preferred embodiment as illustrated in FIGS. 6A to 6D. FIG. 10 offers an exemplary structure of transaction classification codes in accordance with the third preferred embodiment of the present invention. In the third preferred embodiment, the transaction classification codes are grouped into four sections C1 to C4 as shown in FIG. 10. C1 indicates eight types of transaction classification codes 1 to 8 classified based on 'fundamental characteristics of transaction' as shown in FIG. 7. C2 represents six types of transaction classification codes 1 to 6 divided based on 'a simplicity/complicacy characteristic of transaction' integrated with 'original characteristics of journalizing'. Further, C3 and C4 indicate 'a transaction classification code for main part' and 'a transaction classification code for partner part', respectively, based on the 'original characteristics of journalizing'.

In the third preferred embodiment, a maximum ten-step transaction classification process is performed in order to classify a transaction, wherein the maximum ten-step process includes 'a four-step classification based on fundamental characteristics of transaction', 'a maximum four-step classification based on original characteristics of journalizing', and 'a maximum two-step classification based on a simplicity/complicacy characteristic of transaction' based on preset binary classification criteria.

So far, the process for allotting transaction classification codes in the step S330 in FIG. 3 has been described. After the step S330, the step S340 begins. The transaction outline extracting unit 184 of the automatic journalizing management server 181 in the system 180 generates transaction outline information including 'account-matched transaction outline' having transaction classification codes in a preset format. Then, the generated transaction outline information is stored and accordingly, the transaction outline information DB 186 is rendered. At this time, it should be noted that there may be two or more transaction outlines matched with one transaction classification code.

The preset format will be described later with reference to Table 2. For example, the preset format may represent that the transaction outline information includes user part data and automatic processing part data as illustrated in Table 2, wherein the user part data have a transaction outline while the automatic processing part data has a debit account, a credit account, transaction classification code and a user code. The user part data may further have a transaction outline number.

In the step S350, the system 180 controls a user's access and log-in process to the system 180 (i.e., the automatic journalizing management server 181) via the user interfaces 301 to 303, the communications network 200, and the web server 179. Such log-in process indicates that the system 180 verifies the user based on user information (e.g., a user ID, a password, a resident registration number, a phone number and the like).

At the step S370, a search and input menu is provided to the user for allowing the user to retrieve transaction outlines, select a transaction outline and input transaction data. With the aid of the search and input menu, the user can retrieve transaction outlines, select a transaction outline and input transaction data.

In detail, at step S370, the user searches for and selects a transaction outline and then inputs corresponding transaction data by using the search and input (search/input) menu. At step S370, in order to perform retrieval and selection of the transaction data, a transaction type is first designated and then the transaction outline is selected among one or more transaction outlines corresponding to a transaction classification code of the designated transaction type through the search/input menu.

For example, in accordance with a preferred embodiment of the present invention, if the user determines a transaction type by using the search/input menu for searching for and selecting a transaction outline, at least one transaction outline of a transaction classification code corresponding to the determined transaction type is offered to the user and then the user selects a transaction outline with the aid of the search/input menu.

The control unit 183 of the automatic journalizing management server 181 provides a user menu input screen through the web server 170, so that the search/input menu can be offered to the user. Hereinafter, specific examples will be described in order to explain processes for providing the user menu, searching for and selecting a transaction outline and inputting corresponding data. The transaction data refers to transaction-related data inputted by a user who is not an accountant. In this case, it should be noted that the transaction data does not include information on a selection between a debit side and a credit side and an account input for a specific transaction, which are performed by a professional accountant in order to implement a conventional manual journalizing method and system. The transaction data generally include transaction-related data such as a transaction amount, a client name and a transaction date.

While a conventional journalizing system has a single method for providing a transaction outline selection menu to a user, the present invention has various methods for providing a user menu. In other words, in the present invention, the user can search for and select a transaction outline by using various methods such as a key word search, a multi-step menu selection or the like.

Moreover, in accordance with the third preferred embodiment, the user menu can be multi-dimensionally composed, so that the user can access either one of a 'main part' and a 'partner part' and, further, either one of a 'fundamental transaction' and an 'incidental transaction' in order to search for a transaction outline. For instance, referring to FIG. 10, there is illustrated a case where a user accesses the partner part in order to search for and select a transaction outline and then selects 'cash'. At this time, a code value '1' corresponding to a second section C42 of C4 is selected, and the user can select a transaction outline corresponding to a transaction to be journalized through any access code among C1, C2, and C4. In addition, if the user selects a code '3' indicating 'expense' from C1 based on fundamental characteristics of a transaction, a transaction outline list corresponding thereto is offered to the user. Then, the user can conveniently select a desired transaction outline through any access code among C2, C3, and C4.

As can be seen from FIG. 10, since a transaction classification code is multi-dimensionally composed, a user can easily search for and select a transaction outline from transaction data through various access paths, to thereby conveniently perform an automatic journalizing.

An exemplary composition of transaction outline information in accordance with the second preferred embodiment will be described in a following table 2.

TABLE 2

| User part | | Automatic processing part | | | |
|---|---|---|---|---|---|
| Transaction outline No. | Transaction outline | Debit account | Credit account | Transaction classification code | User code |
| 101 | merchandise credit sales | accounts receivable | merchandise sales | 1111200 | 101001 |
| 102 | collection of credit sales amount as a note | notes receivable | accounts receivable | 1202200 | 101003 |
| 201 | merchandise credit purchase | merchandise | accounts payable | 1121200 | 101002 |
| 202 | settlement of credit purchase amount as a note | accounts payable | notes payable | 1202200 | 101003 |
| 501 | payment of payroll | payroll | ordinary deposit | 1221122 | 101005 |

The table 2 illustrates an example in which transaction outline information has user codes. Herein, in addition to transaction classification codes based on the preset binary classification criteria, the user codes based on a user type classification are used for separately managing data depending on a business type of an enterprise. Further, it is possible to separately manage shared data from access-restricted data.

For example, in the second preferred embodiment of the present invention, in case a merchandise is purchased for 1,000 won on credit, a user selects or inputs "merchandise" for a purchase type and "credit" for a transaction type by using the search/input menu. Then, the user selects a transaction type and the selected transaction type data are transmitted to the transaction outline extracting unit 184 through the control unit 183 of the automatic journalizing management server 181. Then, the transaction outline extracting unit 184 determines a transaction classification code based on the transaction type data and then extracts transaction outline data (e.g., a transaction outline list) corresponding to the determined transaction classification code from the transaction outline information DB 186. Next, the extracted transaction outline data are sent to a corresponding user interface through the control unit 183, the web server 170, and the communications network 200.

For instance, based on data inputted by a user, the transaction outline extracting unit 184 determines a transaction classification code as "1121200" in the automatic processing part shown in the table 2. Then, a transaction outline No. 201, "merchandise credit purchase", corresponding to the determined transaction classification code is extracted as transaction outline data from transaction outlines in transaction outline information stored in the transaction outline information DB 186. Thereafter, the extracted data are provided to a user interface. Then, the user inputs transaction data (e.g., an transaction amount, a client name, dates).

In the step S380, the journalizing processing unit 182 of the automatic journalizing management server 181 automatically determines 'accounts of debit and/or credit sides (hereinafter, referred to as 'accounts of D/C')' corresponding to the transaction outline selected through the search/input menu (e.g., by the user) and performs automatic journalizing by using the determined accounts of D/C and transaction data inputted (by the user). Then, accounting information is generated and stored in the accounting information DB 110, thereby terminating a procedure of the automatic journalizing in accordance with the present invention.

A specific description of the step S380 is as follows. In the second preferred embodiment of the present invention, in case a transaction outline, e.g., 'merchandise credit purchase' matched with a transaction classification code "1121200" illustrated in the table 2, is selected by a user and transmitted from the control unit 183 to the journalizing processing unit 182, the journalizing processing unit 182 can automatically extract accounts of D/C from transaction outline information. For example, "merchandise" and "credit purchase" are respectively extracted as a debit and a credit account corresponding to the transaction classification code "1121200" from the automatic processing part in the table 2. Next, the journalizing processing unit 182 automatically journalizes transaction outline data, accounts of D/C, transaction data and the like through a journalizing engine based on transaction data inputted by the user. Accordingly, accounting information is generated and stored in the accounting information DB 110. The control unit 183 can provide a result of the automatic journalizing to the user through an information displaying screen of a corresponding user interface.

Specific examples of the steps S370 and S380 in accordance with the second preferred embodiment of the present invention have been described above. Hereinafter, specific examples of the steps S370 and S380 in accordance with the third preferred embodiment of the present invention will be described. FIGS. 11A and 11B set forth an exemplary structure of transaction outline information in which accounts of D/C in each transaction outline are matched with transaction classification codes shown in FIG. 10. A code number '0' in FIGS. 11A and 11B indicates that there is no selectable item.

The transaction outline information illustrated in FIGS. 11A and 11B includes 'user code' and 'DB classification'. The 'user code' is used for classifying data according to a business type of an enterprise or separately managing shared data and access-restricted data. The 'DB classification' is used for classifying a journalizing process of a transaction into a 'simple journalizing' for a simple transaction and a 'complex journalizing' for a complex transaction. The following is an example of the journalizing process for a complex transaction.

A 'complex transaction' to be journalized in accordance with the third preferred embodiment of the present invention is assumed to be described as follows: There exists a used vehicle for business purposes. A book value of the vehicle amounts to 2,000,000 won, and an accumulated depreciation thereof reaches 1,200,000 won. The vehicle is sold for 700,000 won consisting of 500,000 won as a bank deposit and 200,000 won as accounts receivable. In case a professional accountant performs a manual journalizing for the above 'complex transaction', journalizing information on the disposal of the used vehicle for business purposes is obtained, as will be seen in a following table 3.

TABLE 3

| Debit | Amount (won) | Credit | Amount (won) |
| --- | --- | --- | --- |
| accumulated depreciation | 1,200,000 | vehicles and transportation equipment | 2,000,000 |
| Bank deposit | 500,000 | | |
| accounts receivable | 200,000 | | |
| loss on disposal of assets | 100,000 | | |
| Total | 2,000,000 | Total | 2,000,000 |

It is very difficult for a novice in accounting (non-accountant) to perform journalizing of the above-described complex transaction as shown in Table 3. However, in accordance with the third preferred embodiment of the present invention, a complex transaction as well as a simple transaction can be automatically journalized in the system 180 even by a non-accountant just by selecting a guide menu and inputting transaction data. FIG. 12 provides a flowchart for illustrating sub-processes of the steps S370 and S380 for searching for a transaction outline, generating accounting information and storing the generated information during the automatic journalizing process in accordance with the third preferred embodiment of the present invention.

In the step S1210, if a non-accountant selects a search/input menu or inputs transaction outline search data, a part of transaction classification codes is determined. In the step S1220, 'a first transaction outline list' corresponding to the determined part of transaction classification codes is provided to the user. For example, if the user selects 'collection of credit sales amounts' from a search/input menu or inputs corresponding transaction outline search data through the web server 170 in the step S1210, a transaction classification code of the 'collection of credit sales' is determined based on code classification shown in FIG. 10. To be specific, 'credit sales' is regarded as sales 2 according to code classification based on original characteristics of transaction (represented by C11 in region C1 of FIG. 10). Further, the 'collection of credit sales' is regarded as a settlement execution transaction 2 and as a settlement execution of a deferred transaction 2 in accordance with code classification for a corresponding main part (represented by C31 and C32 in region C3 of FIG. 10). Therefore, the parts C11, C31 and C32 of the transaction classification code are determined as 2, 2, and 2, respectively, by the automatic journalizing management server 181. Thereafter, in the step S1220, the automatic journalizing management server 181 provides the user with 'the first transaction outline list', i.e., three transaction outlines indicated as 21, 22, and 23 in FIG. 11A, corresponding to the determined parts of transaction classification codes (i.e., C11=2, C31=2, and C32=2).

In the step S1230, the user selects a transaction outline from, e.g., the three transaction outlines indicated as 21, 22 and 23 in FIG. 11A. Next, in the step S1235, the automatic journalizing management server 181 checks whether the transaction outline selected by the user in the step S1230 is a simple transaction or a complex transaction. If it is found to be a complex transaction, the process proceeds to the step S1240. On the other hand, if it is determined to be a simple transaction, the process proceeds to the step S1237.

In the step S1237, if the user inputs transaction data corresponding to the simple transaction, simple transaction data to be journalized are determined, thereby proceeding to the step S1260.

The checking process in the step S1235 can be performed in different ways. In other words, if a complex transaction pattern number (to be described later) exists in transaction outline information illustrated in FIGS. 11A and 11B, a transaction outline selected by the user is determined as a complex transaction. Further, in case both a debit and a credit side are filled with accounts of the automatic processing part in the transaction outline information illustrated in FIGS. 11A and 11B, the transaction outline is determined as a simple transaction. On the other hand, if either one of a debit side and a credit side is filled with accounts, it is determined to be a complex transaction.

In the aforementioned table 3, a professional accountant manually journalizes a complex transaction. Hereinafter, however, an automatic journalizing for complex transaction data will be described in accordance with a preferred embodiment of the present invention, the automatic journalizing for the complex transaction being performed by a user's selection/input (through the automatic journalizing system 180).

In case of the complex transaction depicted in the table 3 (hereinafter, referred to as an "exemplary complex transaction"), a non-accountant can select an item from various search/input menus or input transaction outline search data. Especially, since a transaction is classified based on the transaction code classification illustrated in FIG. 10 in the third preferred embodiment of the present invention, the user can easily perform an automatic journalizing for the complex transaction.

For instance, if the user selects 'bank deposit' from the search/input menu or inputs corresponding transaction outline search data in the step S1210, a code of the 'bank deposit' is determined as C41=3 and C42=2 (i.e., C41C42=32) based on the transaction code classification shown in FIG. 10. Accordingly, in the step S1220, the automatic account management server 181 provides the user with <the first transaction outline list> including every transaction outline corresponding to the 'bank deposit', i.e., C41C42=32. In the step S1230, the user selects a single transaction outline from <the first transaction outline list>.

If the transaction outline selected by the user is determined as a complex transaction in the step S1235, the process proceeds to the step S1240. In the step S1240, <the second transaction outline list> including every transaction outline corresponding to complex transaction pattern numbers is offered to the user, wherein the complex transaction pattern numbers indicate a set of complex transactions including the transaction outline selected by the user. Accordingly, the user selects a transaction outline and inputs corresponding transaction data, thereby performing an automatic journalizing for the complex transaction.

For example, in case the user selects a transaction outline corresponding to 'profit on disposal of assets received as a bank deposit (No. 11)' from <the first transaction outline list> in the step S1220, <the second transaction outline list> corresponding to a complex transaction pattern No. 99 is offered to the user in the step S1240, wherein the <second transaction outline list> includes transaction outlines in No. 5 to No. 14 illustrated in FIGS. 11A and 11B.

Next, in a step S1250, the user selects a transaction outline corresponding to each of four classification codes (i.e., 1, 2, 3, and 4) of a complex transaction from 'classification codes based on a simplicity/complicacy characteristic of transaction' (C2) shown in FIG. 10 and then inputs corresponding transaction data, thereby determining the complex transaction data to be journalized.

In case of the exemplary complex transaction, a transaction outline list including transaction outlines in Nos. <5,6>, <7,8,9>, <10,11,12>, <13, 14> shown in FIG. 10 is sequentially or entirely offered to the user, wherein each set of the transaction outlines is matched with the four transaction classification codes (i.e., 1, 2, 3, and 4), respectively. Next, the user inputs corresponding transaction data. To be specific, 2,000,000 won for a book value of a vehicle is inputted to No. 5, 1,200,000 won for an accumulated depreciation to No. 8, 500,000 won for a bank deposit to No. 11, 200,000 won for an accounts receivable to No. 12, and 100,000 won for a loss on disposal of tangible assets to No. 13, thereby determining complex transaction data to be journalized.

Thereafter, in the step S1260, an automatic journalizing is performed for the simple transaction determined in the step S1237 or for the complex transaction determined in the step S1250. As a result, accounting information is generated and stored, thereby terminating the automatic journalizing process.

FIG. 13 illustrates exemplary accounting information generated in accordance with the third preferred embodiment of the present invention described with reference to FIGS. 11A, 11B and 12. The accounting information on the exemplary complex transaction is illustrated in transaction Nos. 106 to 110 corresponding to a journalizing No. 13 shown in FIG. 13.

As described above, transaction classification codes are composed based on various aspects of transactions as shown in FIG. 10. And also, transaction outline information is generated in a manner that transaction outlines are consistently matched with accounts of D/C and transaction classification codes as illustrated in FIGS. 11A and 11B. As a result, the automatic journalizing management server 181 of the system 180 can easily perform an automatic journalizing for a complex transaction by using the account list information DB 185 and a transaction outline information DB 186.

In accordance with the third preferred embodiment of the present invention, since a user can select a transaction outline and input data through various paths, an improved automatic journalizing system can be provided.

As described above, the present invention employing an inverse journalizing method provides an automatic journalizing method and system in which a non-accountant can perform an automatic journalizing for both simple and complex transactions by selecting a transaction outline and inputting transaction data. Further, a transaction is multi-dimensionally classified by using classification criteria based on fundamental characteristics of transaction and original characteristics of journalizing, so that the automatic journalizing can be accurately performed.

While the present invention has been shown and described with respect to the preferred embodiments, it will be understood by those skilled in the art that various changes and modifications may be made without departing from the spirit and scope of the invention as defined in the following claims.

What is claimed is:

1. An automatic journalizing method for use in an automatic journalizing system connected to user interfaces through a communication network, the method comprising the steps of:
   (a) determining a plurality of transaction outlines based on previously prepared transaction outlines;
   (b) matching previously prepared 'accounts of debit and/or credit sides' (hereinafter, accounts of D/C) with each of the plurality of transaction outlines to thereby obtain 'account-matched transaction outlines';
   (c) allotting a transaction classification code to each of the account-matched transaction outlines based on predetermined transaction classification criteria to thereby obtain 'account-matched transaction outlines having transaction classification codes', wherein the predetermined transaction classification criteria are present binary transaction classification criteria;
   (d) generating transaction outline information containing the 'account-matched transaction outlines having transaction classification codes' in a preset format to thereby render a transaction outline information database (hereinafter, referred to as "DB");
   (e) controlling a user's access and log-in process to the system;
   (f) providing a search and input menu for allowing a user to retrieve transaction outlines, select a transaction outline and input transaction data;
   (g) automatically determining accounts of D/C corresponding to the transaction outline selected through the search and input menu; and
   (h) conducting automatic journalizing by using the determined accounts of D/C and the transaction data to thereby obtain accounting information and then storing the accounting information.

2. The method of claim 1, wherein the preset format represents that the transaction outline information includes user part data and automatic processing data, the user part data having a transaction outline and the automatic processing data having a debit account, a credit account, a transaction classification code and a user code.

3. The method of claim 1, wherein the transaction data has a transaction amount, a client name and a transaction date.

4. The method of claim 1, wherein the preset binary transaction classification criteria are either based on "characteristics of settlement" or based on "fundamental characteristics of transaction".

5. The method of claim 1, wherein the preset binary transaction classification criteria are prepared by considering three aspects of 'fundamental characteristics of transaction', 'original characteristics of journalizing' and 'a simplicity/complicacy characteristic of transaction'.

6. The method of claim 5, wherein the preset binary transaction classification criteria are either based on the fundamental characteristics of transaction and include four pairs of alternative items of 'ordinary activity transaction or closing activity transaction', 'purchase and sales activity transaction or managing activity transaction', 'occurrence transaction or adjustment transaction' and 'transaction involving cash flows or transaction not involving cash flows'.

7. The method of claim 5, wherein the transaction classification criteria are based on the fundamental characteristics of transaction and include four pairs of alternative items of 'transaction with external sides or transaction with internal sides', 'transaction involving profit or loss or transaction not involving profit and loss', 'cash borrowing transaction or cash investment transaction' and 'transaction with cost or transaction without cost'.

8. The method of claim 7, wherein the preset binary transaction classification criteria based on the original characteristics of journalizing distinguish a 'main part' and a 'partner part', wherein the 'main part' indicates an aspect of transaction pertaining to profit-gaining activities while the 'partner part' is an aspect of transaction pertaining to encashment followed by the profit-gaining activities.

9. The method of claim 8, wherein the binary classification criteria are based on the simplicity/complicacy characteristic of transaction and distinguish a simple transaction and a complex transaction, wherein the simple transaction refers to a case where the 'main part' and the 'partner part' are matched as one-to-one correspondence while the complex transaction refers to a case where the main part' and the 'partner part' are matched as one-to-one, one-to-many or many-to-many correspondence.

10. The method of claim 9, wherein transaction classification codes based on the fundamental characteristics of transaction include codes defining 8 different transaction types of 'purchase transaction', 'sales transaction', 'transaction accompanying expense', 'transaction accompanying income', 'cash inflow transaction', 'cash outflow transaction', 'transfer account transaction involving profit or loss' and 'transfer account transaction not involving profit and loss'.

11. The method of claim 10, wherein the transaction classification codes include two different classification codes representing 'debit' and 'credit'; and the transaction classification codes include four different classification codes defining 'main part—fundamental transaction', 'main part—incidental transaction', 'partner part—fundamental transaction' and 'partner part—incidental transaction' obtained by applying the concept of 'fundamental transaction versus incidental transaction' to each of the 'main part' and the 'partner part'.

12. The method of claim 11 wherein the steps (f), (g) and (h) include the steps of:
   determining a part of a transaction classification code based on either the search and input menu selection or transaction outline search data input;
   providing the user with 'a first transaction outline list' corresponding to the determined part of the transaction classification code;
   allowing a user to select a transaction outline;

determining whether the selected transaction outline is a simple transaction or a complex transaction;

determining simple transaction data to be journalized by inputting transaction data for a simple transaction if it is determined that the selected transaction outline corresponds to a simple transaction;

providing a 'second transaction outline list' corresponding to a pattern number of a complex transaction if the selected transaction outline corresponds to a complex transaction;

allowing the user to select a transaction outline corresponding to each of the four classification codes of 'main part—fundamental transaction', 'main part—incidental transaction', 'partner part—fundamental transaction' and 'partner part—incidental transaction' and allowing the user to input data, thereby determining complex transaction data to be journalized; and performing the automatic journalizing for the determined simple or complex transaction data to thereby obtain accounting information and storing the accounting information.

13. An automatic journalizing system comprising:

a user information database(hereinafter, referred to as "DB") containing information to identify a user based on preset binary transaction criteria;

an account list information DB having previously prepared 'accounts of debit and/or credit sides' (hereinafter, accounts of D/C);

a transaction outline information DB containing transaction outline information having 'account-matched transaction outlines having transaction classification codes' obtained by a series of processes of determining a plurality of transaction outlines, matching the accounts of D/C with each of the transaction outlines to thereby obtain 'account-matched transaction outlines', and then allotting a transaction classification code to each of the 'account-matched transaction outlines';

an accounting information DB containing accounting information;

a web server for intermediating a user to access the automatic journalizing system via user interfaces and a communications network to retrieve data from the automatic journalizing system and input necessary data thereto; and an automatic journalizing management server for controlling a series of processes for generating the transaction outline information DB, controlling a user's access and log-in to the automatic journalizing system via the web server based on the user information stored in the user information DB, providing the user with a user menu for 'retrieval and selection of a transaction outline and input of transaction data', automatically determining accounts of D/C corresponding to a selected transaction outline, conducting automatic journalizing by using determined accounts of D/C and inputted transaction data to thereby obtain accounting information and then storing the accounting information in the accounting information DB, wherein the transaction data has a transaction amount, a client name and a transaction date.

14. The system of claim 13, wherein the automatic journalizing management server determines a transaction classification code based on data for the retrieval of the inputted transaction outline; extracts transaction outline data corresponding to the determined transaction classification code from the transaction outline information DB and provides the extracted transaction outline data to allow the user to select the transaction outline; automatically determines the accounts of D/C corresponding to the selected transaction outline; performs the automatic journalizing by using the determined accounts of D/C and the inputted transaction data to thereby obtain the accounting information; and then stores the accounting information DB.

15. The system of claim 13, wherein the automatic journalizing management server includes:

a control unit for controlling the log-in process of the user accessing the automatic journalizing system via the web server based on the user information stored in the user information DB, sending the data for the retrieval of the inputted transaction outline to a transaction outline extracting unit, providing the user with at least one transaction outline data received from the transaction outline extracting unit via the web server and offering the selected transaction outline and the inputted transaction data to a journalizing processing unit;

the transaction outline extracting unit for mediating a series of processes for generating the transaction outline information DB by utilizing the account list information DB, determining the transaction classification code based on the data for the retrieval of the inputted transaction outline, extracting the transaction outline data corresponding to the determined transaction classification code from the transaction outline information DB and sending the extracted transaction outline data to the control unit; and the journalizing processing unit for automatically determining the accounts of D/C corresponding to the extracted transaction outline inputted from the control unit, performing the automatic journalizing by using the determined accounts of D/C and the transaction data to thereby obtain the accounting information and then storing the accounting information in the accounting information DB.

* * * * *